US012681604B2

(12) United States Patent
Kim et al.

(10) Patent No.: US 12,681,604 B2
(45) Date of Patent: Jul. 14, 2026

(54) DISPLAY DEVICE, ELECTRONIC DEVICE INCLUDING THE SAME, AND METHOD OF DRIVING THE SAME

(71) Applicant: Samsung Display Co., Ltd., Yongin-Si (KR)

(72) Inventors: Ki Young Kim, Yongin-si (KR); Dong Lim Kim, Yongin-si (KR); Kyung Hyun Choi, Yongin-si (KR); Eun Hye Kim, Yongin-si (KR); Ji Yun Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/089,385

(22) Filed: Mar. 25, 2025

(65) Prior Publication Data

US 2025/0383738 A1     Dec. 18, 2025

(30) Foreign Application Priority Data

Jun. 17, 2024    (KR) ........................ 10-2024-0078194
Sep. 4, 2024    (KR) ........................ 10-2024-0120205

(51) Int. Cl.
| | |
|---|---|
| *G06F 3/041* | (2006.01) |
| *G06F 3/042* | (2006.01) |
| *G09G 3/00* | (2006.01) |
| *G09G 3/32* | (2016.01) |

(52) U.S. Cl.
CPC .......... *G06F 3/04184* (2019.05); *G06F 3/042* (2013.01); *G09G 3/035* (2020.08); *G09G 3/32* (2013.01); *G09G 2300/0819* (2013.01); *G09G 2300/0852* (2013.01); *G09G 2310/08* (2013.01); *G09G 2320/0233* (2013.01); *G09G 2320/041* (2013.01); *G09G 2354/00* (2013.01); *G09G 2360/145* (2013.01)

(58) Field of Classification Search
None
See application file for complete search history.

(56) References Cited

U.S. PATENT DOCUMENTS

| | | | | |
|---|---|---|---|---|
| 12,288,522 B1 * | 4/2025 | Yang | .................... | G09G 3/3258 |
| 2019/0206953 A1 * | 7/2019 | Hsieh | .................... | H10K 59/65 |

* cited by examiner

*Primary Examiner* — Parul H Gupta
(74) *Attorney, Agent, or Firm* — Innovation Counsel LLP

(57) ABSTRACT

A display device including a display panel including a first display area containing first pixels at a first density and a second display area containing second pixels at a second density smaller than the first density, each of the first pixels and the second pixels including a light-emitting element, a power supply circuit configured to supply a first anode initialization voltage to each of the first pixels and supply a second anode initialization voltage to each of the second pixels, and a timing controller configured to control the power supply circuit so that a voltage level of the second anode initialization voltage becomes greater than a voltage level of the first anode initialization voltage.

9 Claims, 24 Drawing Sheets

DISPLAY DEVICE, ELECTRONIC DEVICE INCLUDING THE SAME, AND METHOD OF DRIVING THE SAME

CROSS-REFERENCE TO RELATED PATENT APPLICATIONS

The present application claims priority under 35 U.S.C. § 119a to Korean patent application number 10-2024-0078194, filed on Jun. 17, 2024, and Korean patent application number 10-2024-0120205, filed on Sep. 4, 2024, in the Korean Intellectual Property Office, the entire disclosures of which are incorporated by reference herein.

BACKGROUND OF THE INVENTION

Field

Embodiments of the present disclosure relate to a display device, an electronic device including the same, and a method of driving the same.

Description of the Related Art

A display device such as a smart phone may include at least one display area. The display area may act a data output device on which data may be displayed. In addition, the display area may be equipped with a touch sensor and may act as a data input device, e.g., a touch screen. Such a display area may be on the front surface of the display device and may display various information. Some display devices in common use today are flat panel display devices such as a liquid crystal display (LCD) panel, a plasma display panel (PDP), and an organic light-emitting diode (OLED) display device.

Recent display devices such as mobile terminals may have display areas that occupy most of the front surfaces of the display devices, and various sensors such as cameras or other image sensors, proximity sensors, fingerprint recognition sensors, illuminance sensors, or infrared (or near-infrared) sensors to name a few, may be disposed to overlap portions of the display areas. Operation of a sensor located on the front surface of the display device may cause the temperature of the display device to locally rise in the area overlapping with the sensor. Such a rise in temperature may change the luminous efficiency, causing a difference in luminance between the area at the higher temperature and the area at the lower temperature. Therefore, systems and methods are needed to improve image visibility by compensating for luminance deviations caused by the operation of sensors in display devices.

SUMMARY OF THE INVENTION

A technical object of the present disclosure is to provide a display device capable of compensating for changes in luminance due to operations of a sensor. Such an object may be embodied in display devices, other electronic devices including display devices, and methods of driving electronic or display devices.

An embodiment of the present disclosure may provide a display device including a display panel including a first display area in which first pixels are disposed at a first density and a second display area in which second pixels are disposed at a second density that is lower than the first density. Each of the first pixels and the second pixels includes a light-emitting element, a power supply circuit configured to supply a first anode initialization voltage to the light-emitting element included in each of the first pixels and supply a second anode initialization voltage to the light-emitting element included in each of the second pixels. A timing controller may be configured to control the power supply circuit so that a voltage level of the second anode initialization voltage may become greater than a voltage level of the first anode initialization voltage.

A light transmittance of the second display area may be higher than a light transmittance of the first display area.

The display panel may include a display area including the first display area and the second display area, and a non-display area located around the display area and including a pad area. The pad area may include a first pad to which the first anode initialization voltage is applied and a second pad to which the second anode initialization voltage is applied.

The power supply circuit may include a voltage conversion circuit electrically connected to the second pad and electrically isolated from the first pad.

The power supply circuit may be configured to supply the first anode initialization voltage at a first level and to supply the second anode initialization voltage by sequentially increasing the second anode initialization voltage from the first level to a second level and then to a third level.

The first pixel may include a first sub-pixel comprising a light-emitting element of the first pixel, and the second pixel comprises a second sub-pixel comprising a light-emitting element of the second pixel. Each of the first sub-pixel and the second sub-pixel may include a first anode initialization transistor. The first anode initialization transistor of the first sub-pixel may be configured to switch an electrical connection between the light-emitting element of the first sub-pixel and a $4a^{th}$ power line to which the first anode initialization voltage is applied. The first anode initialization transistor of the second sub-pixel may be configured to switch an electrical connection between the light-emitting element of the second sub-pixel and a $4b^{th}$ power line to which the second anode initialization voltage is applied.

The second sub-pixel may further include a second anode initialization transistor. The second anode initialization transistor of the second sub-pixel may be configured to switch an electrical connection between the light-emitting element of the second sub-pixel and the $4a^{th}$ power line to which the first anode initialization voltage is applied.

The first anode initialization transistor and the second anode initialization transistor of the second sub-pixel may each be connected to different sub-scan lines.

An embodiment of the present disclosure may provide an electronic device including a sensor configured to emit infrared light, a display device including a first display area in which first pixels are disposed at a first density and a second display area in which second pixels are disposed at a second density lower than the first density. The display device may be configured to supply a first anode initialization voltage to the first pixels and supply a second anode initialization voltage to the second pixels, and a host may be configured to output a control signal to the display device so that a voltage level of the second anode initialization voltage becomes higher than a voltage level of the first anode initialization voltage while the sensor emits the infrared light.

The sensor may overlap the second display area in a direction in which the infrared light is emitted.

The first display area may surround the second display area.

The display device may include a power supply circuit configured to supply the first anode initialization voltage and the second anode initialization voltage. The host may be configured to, output an infrared sensor control signal for controlling a timing at which the sensor outputs the infrared light, and output a power supply circuit control signal for changing the voltage level of the second anode initialization voltage output by the power supply circuit in accordance with a timing at which a level of the infrared sensor control signal changes.

The infrared sensor control signal may have either a low level corresponding to a period in which the sensor is not operating or a high level corresponding to a period in which the sensor is operating. The power supply circuit may be configured to raise the voltage level of the second anode initialization voltage from a first level during a period in which the infrared sensor control signal of the high level is input to the sensor. The first level may be the level of the first anode initialization voltage.

The power supply circuit may be configured to, when the sensor emits the infrared light, supply the second anode initialization voltage at a second level higher than the first level for a threshold period.

A length of the threshold period may be less than one minute.

The power supply circuit may be configured to, when the sensor emits the infrared light and the threshold period has elapsed, supply the second anode initialization voltage at a third level higher than the second level.

The power supply circuit may be configured to, when the sensor stops emitting the infrared light, supply the second anode initialization voltage at the first level.

An embodiment of the present disclosure may provide a method of driving an electronic device, the method including supplying a first anode initialization voltage at a first level to first pixels disposed at a first density in a first display area, and supplying a second anode initialization voltage at the first level to second pixels disposed at a second density lower than the first density in a second display area, operating a sensor that overlaps the second display area to emit infrared light, and supplying the first anode initialization voltage at the first level to the first pixels and supplying the second anode initialization voltage at a second level higher than the first level to the second pixels.

Each of the first pixels and the second pixels may include at least one light-emitting element. The light-emitting element in each of the second pixels may include an anode electrode that receives the second anode initialization voltage. The light-emitting element in each of the first pixels may include an anode electrode that receives the first anode initialization voltage.

The anode electrodes of the light-emitting elements in the second pixels may be further supplied with the first anode initialization voltage.

BRIEF DESCRIPTION OF THE DRAWINGS

FIG. 1 is a perspective view schematically illustrating the front of an electronic device according to an embodiment of the present disclosure.

FIGS. 4 and 5 show modifications of the display device of FIG. 3.

FIG. 6 is a cross-sectional diagram taken along line I-I' of FIG. 3.

FIG. 7 is a system block diagram of a display device according to an embodiment of the present disclosure.

FIG. 14 is an equivalent circuit diagram of an embodiment of a sub-pixel included in a second pixel.

DETAILED DESCRIPTION

Figure 2:
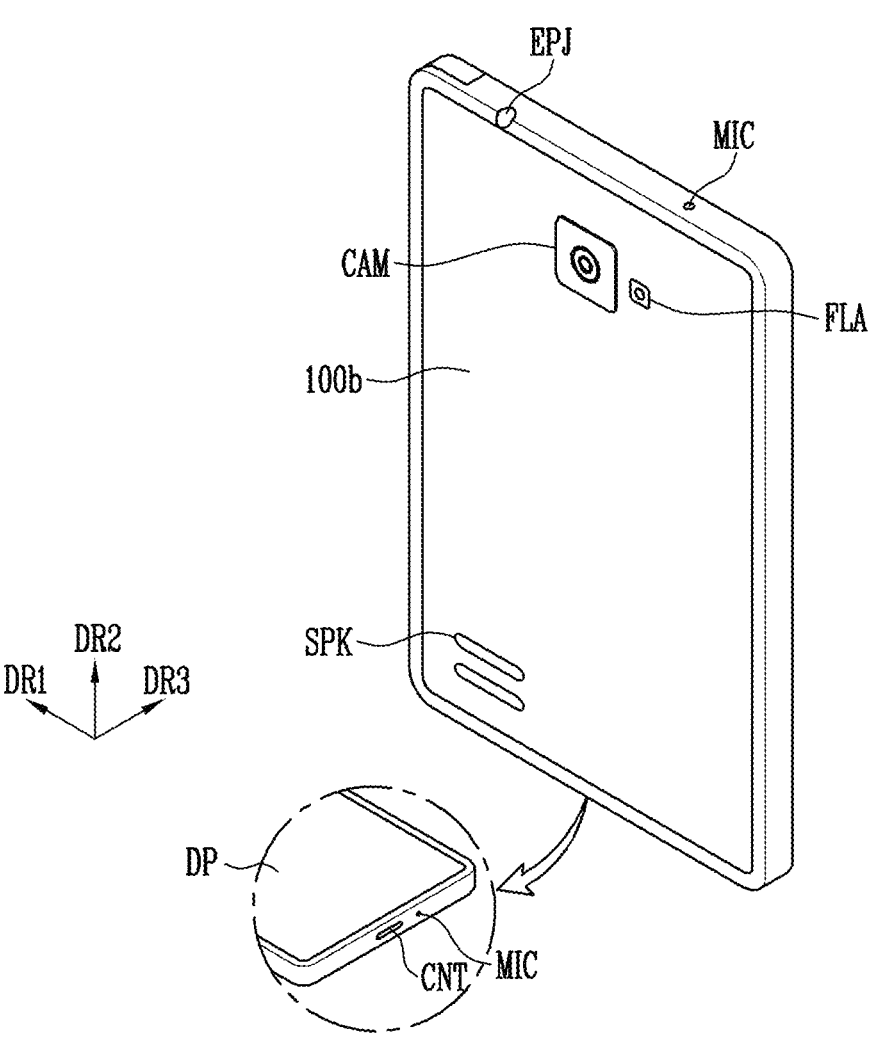
FIG. 2 is a perspective view schematically illustrating the back of the electronic device of FIG. 1.

Various example embodiments are described in detail below with reference to the accompanying drawings, so that those skilled in the art may easily understand and implement embodiments in accordance with the present disclosure. Embodiments in accordance with the present disclosure may be implemented in various different forms and are not limited to the example embodiments described herein.

In order to clearly describe aspects of the present disclosure, parts that are not important to the description may be omitted below. For brevity, components that are the same or similar may be assigned the same reference numerals throughout the specification and the drawings. Therefore, reference numerals used in one drawing may also be used in other drawings, but redundant description of elements corresponding to the same reference number may not be repeated in the description below.

The size or thickness of each component shown in the drawings may be arbitrary or shown for the convenience of description or illustration, so the present disclosure is not necessarily limited to the shapes or proportions shown. In the drawings, the thickness may, for example, be exaggerated in order to clearly show various layers and areas.

Further, the expression "the same" or "identical" in the description may refer to "substantially the same" or "substantially identical." In other words, such expressions may indicate that two parts are sufficiently identical that a person skilled in the art would tend to identify the parts as being identical. Other expressions may also be expressions from which the word "substantially" is omitted.

The terms such as first, second, $a^{th}$, and $b^{th}$ may be used to describe various components, but the components should not be limited by the terms. The terms are used only for the purpose of distinguishing one component from another. For example, without departing from the scope of the present disclosure, a first component may be referred to as a second component, and similarly, the second component may also be referred to as the first component. In the following, a singular expression includes the corresponding plural expression unless the context clearly indicates otherwise.

The terms such as "below", "lower", "above", and "upper" are used to describe relationships between components illustrated in the drawings. The terms are relative concepts and are described based on the directions indicated in the drawings.

Unless otherwise defined, all terms (including technical and scientific terms) used herein have the same meanings as commonly understood by those skilled in the art to which the present disclosure pertains. In addition, terms as used herein such as those defined in commonly used dictionaries should be interpreted to have meanings consistent with their meanings in the context of the relevant technology, unless those meanings would be interpreted in an idealized or overly formal sense.

The terms "comprise", "include", or "have" are intended to specify the presence of a feature, number, step, operation, component, part, or combination thereof described in the specification, but do not exclude the possibility of the presence or addition of one or more other features, numbers, steps, operations, components, parts, or combinations thereof.

In the specification, the meaning of "connected" is not limited to a mechanical or physical connection. For example, "connected" may include being electrically connected.

Hereinafter, embodiments of the present disclosure will be described in detail with reference to the accompanying drawings.

Figure 1:
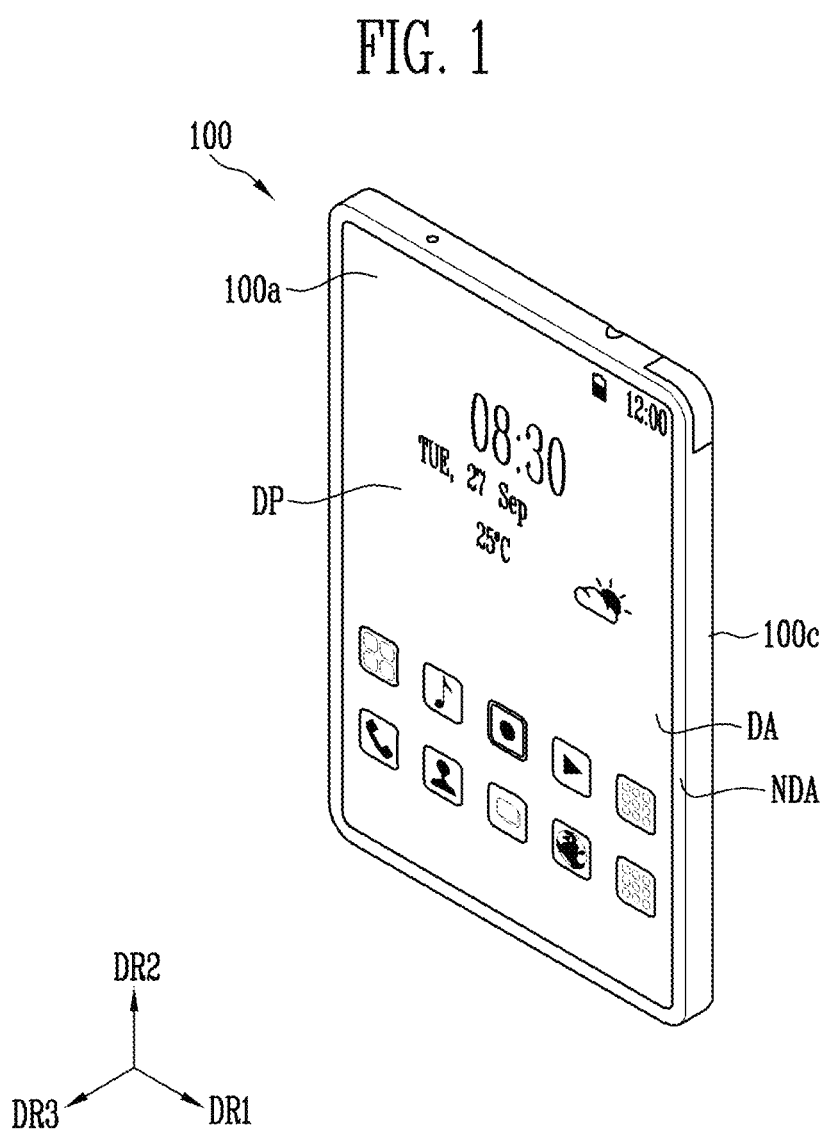

FIG. 1 is a perspective view schematically illustrating the front of an electronic device 100 according to an embodiment in accordance with the present disclosure. FIG. 2 is a perspective view schematically illustrating the back of the electronic device of FIG. 1.

In FIG. 1, for convenience, an example is shown in which a main home screen is displayed on a display panel DP of the electronic device 100.

Referring to FIGS. 1 and 2, the display panel DP may provide or be disposed adjacent to a front surface 100a of the electronic device 100. The front surface 100a of the electronic device 100 may include a display area DA in which the display panel DP displays various data, and a non-display area NDA on at least one side or edge of the display area DA.

A rear camera CAM, a flash FLA, a speaker SPK, and the like may be located at or on a rear surface 100b of the electronic device 100. In addition, a power/reset button, a volume button, a terrestrial DMB antenna for broadcast reception, one or more microphones MIC, etc. may be located on a side surface 100c of the electronic device 100. A connector CNT may be located at or on a lower end side surface of the electronic device 100. The connector CNT may include a plurality of electrodes, which may be connected to an external device via a wire. An earphone connection jack EPJ may be located on or at an upper end side surface of the electronic device 100.

The front surface 100a of electronic device 100 may be made more attractive and may provide a larger display area DA by disposing a component, such as a sensor, under the display area DA and inside of the display panel DP. The component may be an optical component, i.e., a component that uses or is related to light. For example, the component may be an optical component into which external light enters or from which light is emitted. The optical component may include, for example, a fingerprint scanner, an image capture device (e.g., a camera), a strobe, a light sensor, a proximity sensor, an indicator, or a solar panel, etc.

The display panel DP may have a large screen that occupies the entire front surface 100a of the electronic device 100. When the display panel DP occupies the entirety of the front surface 100a of the electronic device 100, the electronic device 100 may be referred to as a "full front display." In the "full front display," the display area DA may be the entire front surface 100a of the electronic device 100.

The above-described display panel DP may be, for example, an organic light-emitting display panel. In this case, the electronic device 100 employing the above-described display panel DP may be an organic light-emitting display device. According to an embodiment, the display panel DP may be further configured as a touch screen including touch electrodes.

FIG. 1 shows an example in which the display panel DP displays a main home screen, and this main home screen may be the first screen displayed on the display panel DP when the electronic device 100 turns on. At this time, the status of the electronic device 100, such as the battery charging status, the strength of a received signal, and the current time, may be displayed in the upper portion of the display panel DP. The display panel DP may further display various contents (for example, text, images, videos, icons, or symbols) to the user.

Figure 3:
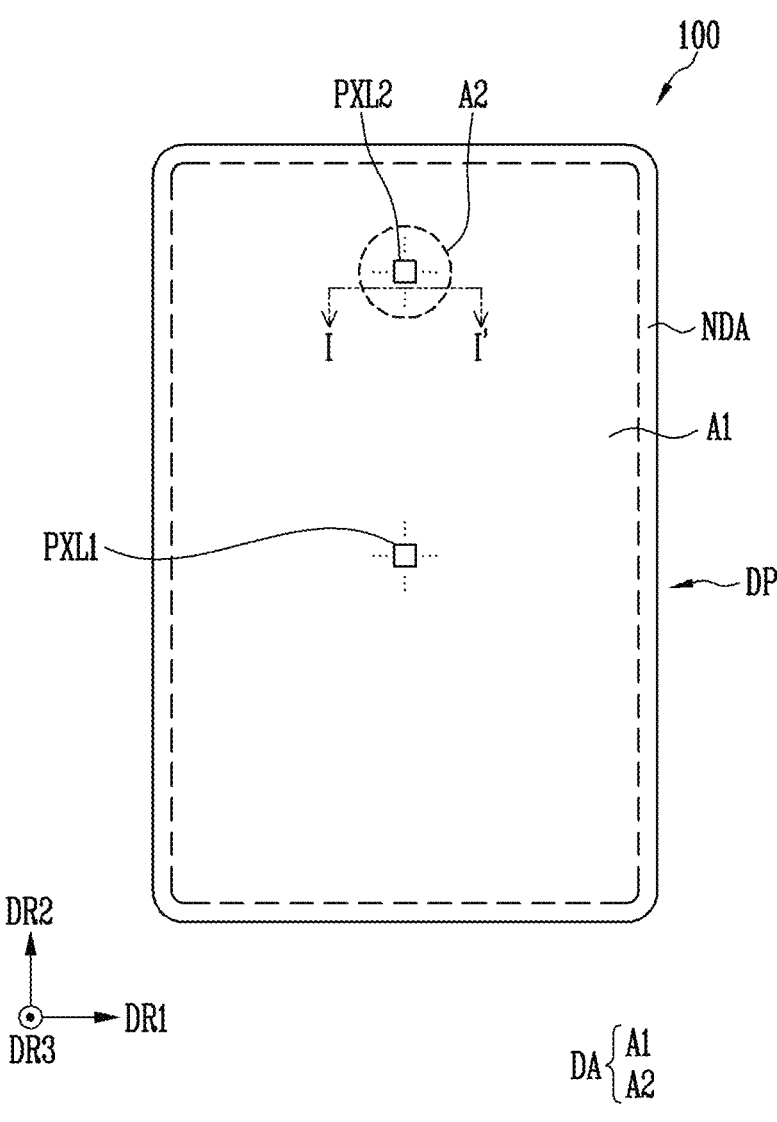
FIG. 3 is a plan view schematically illustrating a display device according to an embodiment of the present disclosure.
Figure 4:
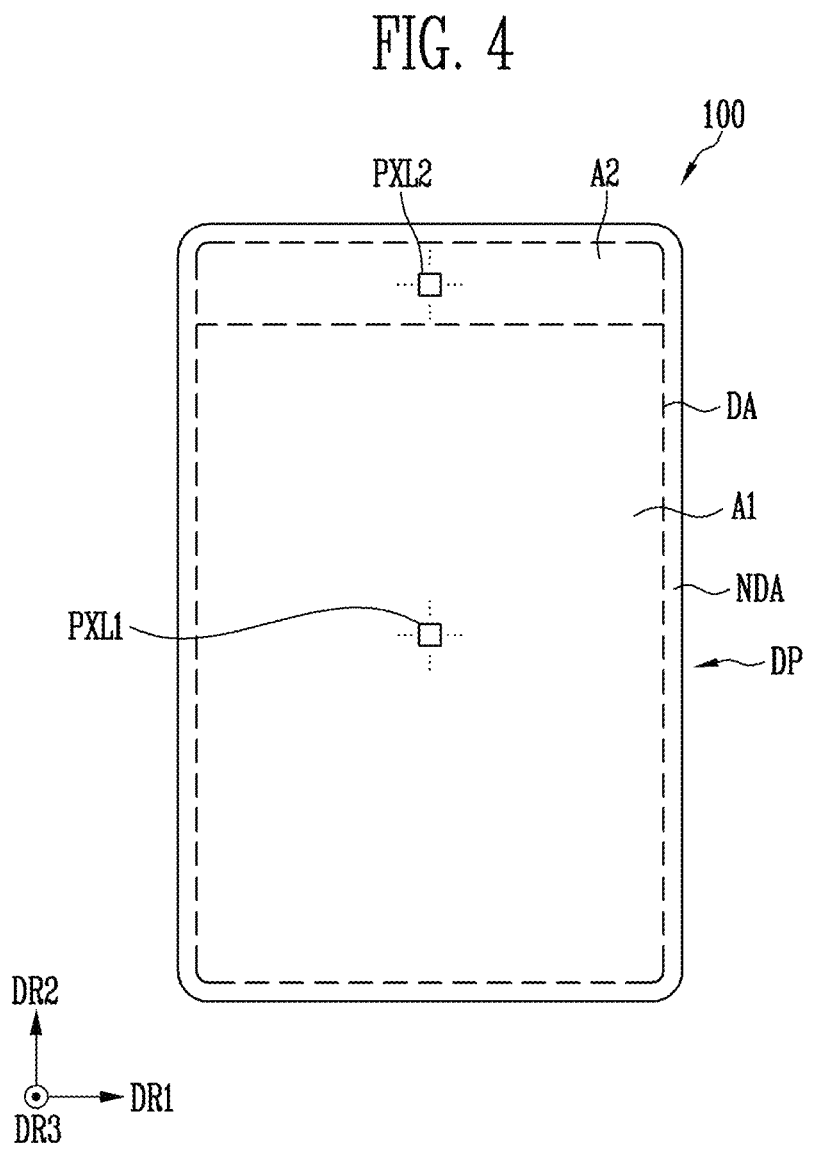
Figure 5:
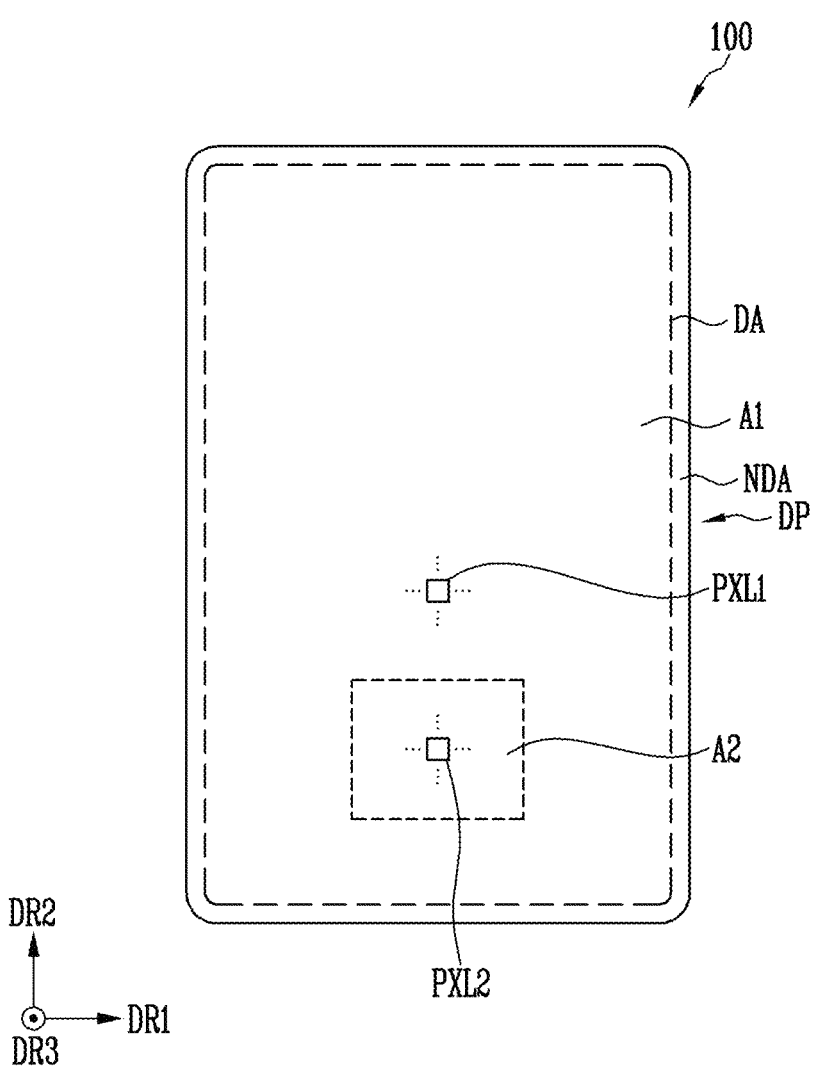
Figure 6:
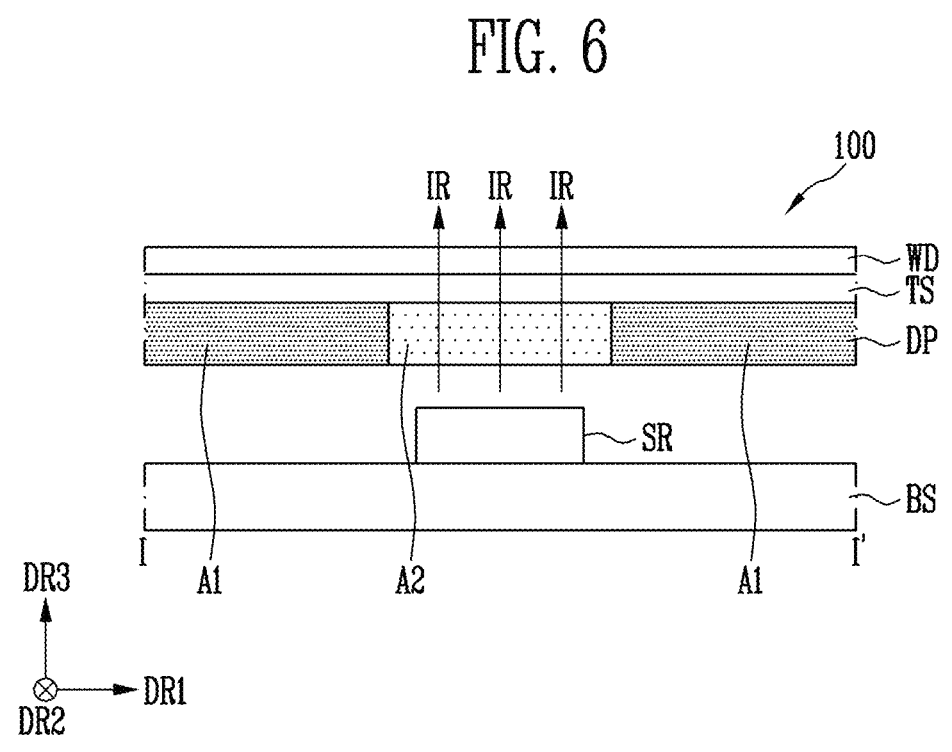

FIG. 3 is a plan view schematically illustrating a display device according to an embodiment of the present disclosure. FIGS. 4 and 5 are plan views illustrating some other embodiments of the present disclosure. FIG. 6 is a cross-sectional diagram taken along line I-I' of FIG. 3.

Referring to FIGS. 1 to 6, at least a portion of the electronic device 100 may be flexible. For example, the entirety of the electronic device 100 may be flexible, or the electronic device may have flexibility in an area, i.e., a flexible area. If the entire electronic device 100 is flexible, the electronic device 100 may be a rollable display device, and if a portion of the electronic device 100 is flexible, the electronic device 100 may be a foldable display device, but embodiments of the present disclosure are not limited thereto.

In an embodiment of the present disclosure, the electronic device 100 may include a display panel DP, a touch sensor TS, a window WD, and at least one sensor SR.

The display panel DP may be on or at a front surface of the electronic device 100. The display panel DP may display any visual information, such as text, video, photos, two-dimensional (2D) or three-dimensional (3D) images, on the front surface (for example, the image display surface) of the display panel DP. The type of display panel DP is not particularly limited if the display panel DP is able to display images. For example, the display panel DP may be a self-luminous display panel, such as an organic light-emitting display (OLED) panel. The display panel DP may alternatively be a non-luminous display panel, such as a liquid crystal display (LCD) panel, an electro-phoretic display panel (EPD panel), and an electro-wetting display panel (EWD panel). When the display panel DP is a non-luminous display panel, the electronic device 100 may include a backlight unit that supplies light to the display panel DP. The following primarily describes an embodiment of the present disclosure in which the display panel DP is an organic light-emitting display panel. However, the type of the display panel DP is not limited thereto, and other display panels may be used that are consistent with the concepts disclosed herein. In an embodiment of the present disclosure, the display panel DP may have the same configuration as the display panel DP employed in the electronic device 100 illustrated in FIG. 1.

The display panel DP may include a display area DA and a non-display area NDA surrounding or adjacent to at least one side of the display area DA.

A plurality of pixels PXL1, PXL2 may be disposed in the display area DA. According to an embodiment, each of the pixels PXL1, PXL2 may include at least one light-emitting element. According to an embodiment, the light-emitting element may be a light-emitting unit including an organic light-emitting diode or an ultra-small inorganic light-emitting diode having a size in the micro to nano scale range, but embodiments of the present disclosure are not limited thereto. The display panel DP may display an image in the display area DA by driving the pixels PXL1, PXL2 in response to input image data. The display area DA may be a large screen disposed to occupy most of the front surface of the electronic device 100.

The non-display area NDA is an area surrounding or adjacent to at least one side of the display area DA, and the non-display area NDA may occupy the remaining area of the front surface excluding the display area DA. According to an embodiment, the non-display area NDA may include a wiring area, a pad area, and/or various dummy areas, etc.

In an embodiment of the present disclosure, the display area DA may occupy the entire front surface of the electronic device 100. If the display area DA occupies the entire front surface of the electronic device 100, the non-display area NDA may not be disposed on the front surface. For a large screen, the non-display area NDA may be in a very narrow area. In particular, the display area DA may be in contact with a side edge of the electronic device 100 or may extend to a predetermined distance from the side edge. In FIGS. 3 to 5, the display area DA is illustrated as being disposed only on the front surface of the electronic device 100, but embodiments of the present disclosure are not limited thereto. According to an embodiment, the display area DA may be disposed on at least one area of a side edge of the electronic device 100, at least one area of a rear surface, etc. The display areas DA disposed on multiple surfaces of the electronic device 100 may be connected or separated from each other at least in some portions.

In an embodiment of the present disclosure, the electronic device 100 may include at least one sensor SR disposed to overlap at least a portion of the display area DA. The sensor SR may be disposed at the part of the display panel DP lower than the pixels PXL1, PXL2, and/or wires disposed in the display area DA, and the pixels PXL1, PXL2, and/or wires may conceal the sensor SR from being visible through the front surface of the electronic device 100. When such a sensor SR overlaps the display area DA, the appearance of the electronic device 100, particularly the appearance of the front surface corresponding to the display area DA, may be more attractive and the display area DA may be wider or otherwise occupy a larger portion of the front surface of the display panel DP.

In an embodiment of the present disclosure, the display area DA may be divided into a first display area A1 and a second display area A2. The first display area A1 may be an area that does not overlap with the sensor SR, and the second display area A2 may be an area that overlaps with the sensor SR. In various embodiments, the first display area A1 may have a larger size (or area) than does the second display area A2.

The second display area A2 may be located inside the display area DA and may be surrounded by the first display area A1, as illustrated in FIGS. 3 and 5. In FIG. 3, the second display area A2 is illustrated as having an approximately circular shape, but the present disclosure is not limited thereto. According to an embodiment, the second display area A2 may have a polygonal shape including a square as illustrated in FIG. 5, and the second display area A2 may have various other shapes such as an oval shape. In addition, a plurality of second display areas A2 may be disposed within the display area DA.

The display area DA may include a first display area A1 and a second display area A2 partitioned by a border extending along one direction, for example, a first direction DR1, as illustrated in FIG. 4. The first display area A1 and the second display area A2 may be adjacent to each other and connected in a second direction DR2. According to an embodiment, the second display area A2 may have a wider area than an area overlapping with the sensor SR. For example, the second display area A2 may extend across the width of one end (for example, the upper end part) the display area DA of the electronic device 100 as illustrated in FIG. 4. In FIG. 4, at least one second display area A2 is illustrated as being disposed only on the upper end part of the front surface of the electronic device 100, but the present disclosure is not limited thereto. Depending on the embodiment, one or more second display areas A2 may be provided, and the second display areas A2 may be disposed adjacent or dispersed anywhere within the display area DA. For example, in an embodiment in which the display area DA is on a side edge and/or a rear surface of the electronic device 100, a portion of the second display areas A2 may be formed within the display area DA of the side edge and/or the rear surface of the electronic device 100.

The sensor SR that overlaps the second display area A2 may be an optical component. In other words, the sensor SR may be a component that receives light or emits light. The sensor SR may include, for example, a fingerprint sensor, an image sensor, a camera, a strobe, a light sensor, an illuminance sensor, a proximity sensor, a color sensor (e.g., an RGB sensor), an infrared sensor, an indicator, and a solar panel or cell, etc. However, the sensor SR is not limited to being an optical component, and the sensor SR may include various components, such as an ultrasonic sensor, a microphone, an environmental sensor (e.g., a barometer, a hygrometer, a thermometer, a radiation detection sensor, a heat detection sensor, etc.), a chemical sensor (a gas detection sensor, a dust detection sensor, an odor detection sensor, etc.). In an embodiment of the present disclosure, the sensor SR may include a plurality of sensors overlapping the second display area A2. Here, the plurality of sensors may include a camera, a proximity sensor, and an illuminance sensor that may be disposed in a row.

The electronic device 100 according to embodiments of the present disclosure may include a base substrate BS. The above-described sensor SR may be disposed on a separate base substrate BS made of a plastic or metal material, such as a bracket, a case, or the like, in a surface mount device SMD manner so as to face (or correspond to) at least one area of the display area DA, for example, the second display area A2.

The second display area A2 may transmit a signal (for example, light or brightness) input to the sensor SR. In order to improve the transmittance of the signal, the transmittance of the second display area A2 may be higher compared to that of the first display area A1. Here, the transmittance of the second display area A2 and the transmittance of the first display area A1 may each be the degree of light transmitted per unit area (or a preset area or the same area). For example, the transmittance may be the ratio of the intensity of light transmitted through the display panel DP to the intensity of light incident on a unit area of the display panel DP. Accordingly, the second display area A2 having a relatively high transmittance may transmit a signal (for example, light or brightness) better than does the first display area A1.

Hereinafter, each pixel disposed in the first display area A1 is a first pixel PXL1, and each pixel disposed in the second display area A2 is a second pixel PXL2.

In an embodiment, the second pixels PXL2 in the second display area A2 may be disposed at a lower density compared to the first pixels PXL1 in the first display area A1. The gaps between the second pixels PXL2 disposed at a low density may form physical and/or optical openings, for example, transmission windows, thereby allowing a signal (for example, light or brightness) to be transmitted better.

Each of the pixels PXL1, PXL2 may include a light-emitting element that emits light. The light-emitting element may be, for example, an organic light-emitting diode, but the present disclosure is not limited thereto. According to an embodiment, the light-emitting element may be an inorganic light-emitting element including an inorganic light-emitting material, or a light-emitting element (quantum dot display element) that changes the wavelength of the emitted light by using quantum dots to emit light. For convenience of explanation, the following description focuses on an embodiment in which each of the pixels PXL1, PXL2 includes an organic light-emitting diode, but embodiments of the present disclosure are not limited thereto.

In an embodiment, the sensor SR may emit infrared light IR. In an embodiment, the infrared light IR may be emitted in a third direction DR3. The infrared light IR may be directed through the display panel DP. Infrared light IR may raise the temperature of the display panel DP locally or across the entirety of the display panel. Accordingly, the temperature of the second display area A2 may locally rise while the sensor SR operates. When the temperature of the second display area A2 rises, the internal capacitances of the light-emitting elements included in the second pixels PXL2 may increase, which may decrease the light-emitting efficiency the second pixels PXL2. Accordingly, during the period in which the sensor SR operates, a capacitor in a light-emitting element may be charged (for example, charged by a predetermined amount) differently compared to the period in which the sensor SR does not operate.

Embodiments of the present disclosure may be applied not only to the case in which the sensor SR emits infrared light IR that raises the temperature of the display panel DP but also to the case in which the sensor SR emits light of a different wavelength band including visible light that may raise the temperature of the display panel DP.

In an embodiment, the electronic device 100 may further include a touch sensor TS and a window WD located on the display panel DP including the above-described configurations.

The touch sensor TS includes touch electrodes and is disposed on the image display surface of the display panel DP to receive a user's touch input and/or hover input. The touch sensor TS may detect touch capacitance caused by contact and/or proximity of a separate input means, such as a user's hand or a similar conductor, to recognize a touch input and/or hover input to the electronic device 100. Here, the touch input may mean direct touching (or contact) by a user's hand or a separate input means, and hover input may mean that a user's hand or a separate input means is near the electronic device 100 including the touch sensor TS but does not touch the electronic device 100.

The touch sensor TS may detect a user's touch action, and the display panel DP may move an object displayed on the electronic device 100 from an originally displayed location to another location in response to the touch action. Here, the touch action may include at least one of a single touch, a multi-touch, and a touch gesture. For example, there may be various touch actions including specific gestures such as enlarging or reducing text or an image by moving the user's finger a certain distance while touching the touch surface of the touch sensor TS.

The window WD may be a member disposed at the uppermost extent of the electronic device 100 including the display panel DP, and the window WD may be a substantially transparent and light-transmitting substrate. The window WD transmits an image from the display panel DP and at the same time cushions external impacts, thereby preventing the display panel DP from being damaged or operating due to external impacts. Here, an external impact may mean an external force that may be expressed as pressure, stress, or the like, and may mean a force that may damage the display panel DP. The window WD may include a rigid or flexible substrate, and the material constituting the window WD is not particularly limited.

Figure 7:
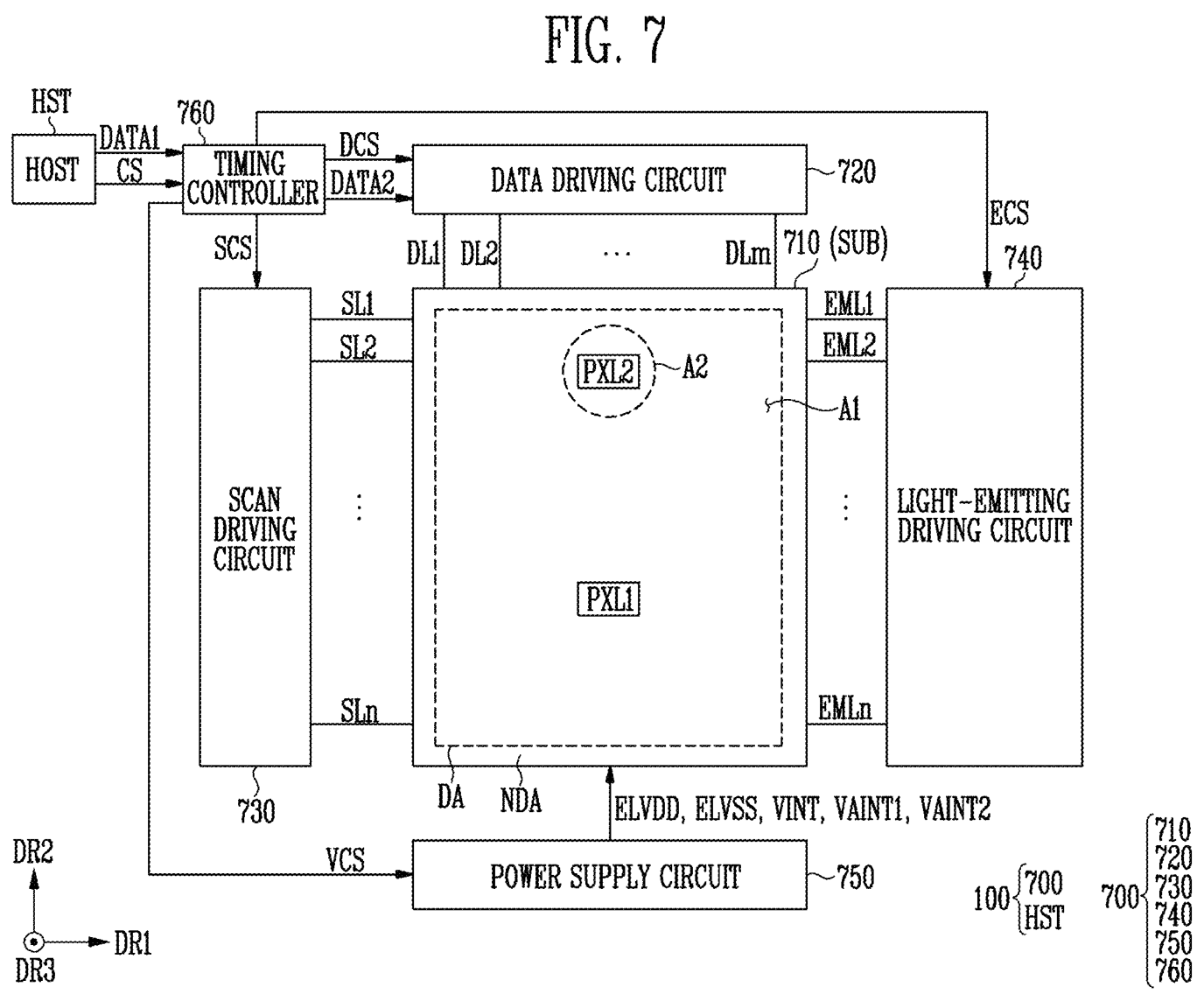

FIG. 7 is a system block diagram of a display device 100 according to an embodiment of the present disclosure.

Referring to FIG. 7, a display device 700 according to the illustrated embodiment may include a display panel 710, a data driving circuit 720, a scan driving circuit 730, a light-emitting driving circuit 740, a power supply circuit 750, and a timing controller 760.

The display panel 710 may include a substrate SUB, and a first display area A1 and a second display area A2 may be located on the substrate SUB. A plurality of first pixels PXL1 may be disposed in the first display area A1, and a plurality of second pixels PXL2 may be disposed in the second display area A2. The display device 700 may further include a plurality of data lines DL1 to DLm (m is an integer greater than or equal to 2), a plurality of scan lines SL1 to SLn (n is an integer greater than or equal to 2), and a plurality of light-emitting control lines EML1 to EMLn electrically connected to the plurality of pixels PXL1, PXL2.

On the display panel 710, one or more power lines may be configured to apply power voltages to the plurality of pixels PXL1, PXL2.

The display panel 710 may include a display area DA in which the plurality of pixels PXL1, PXL2 are disposed, and a non-display area NDA located around the display area DA (e.g., at an edge or around a perimeter of the display area DA).

The display panel 710 may be formed flat, but embodiments of the present disclosure are not limited thereto. For example, the display panel 710 may include curved surface parts formed at one or more ends or edges of the display panel 710. The curved surface may have a constant curvature or a varying curvature. In addition, the display panel 710 may be flexible so as to be curved, twisted, bent, folded, or rolled.

The plurality of data lines DL1 to DLm may extend in one direction from the display panel 710. The one direction may be, for example, the second direction DR2. The plurality of data lines DL1 to DLm may extend in the second direction DR2 from the display panel 710 (for example, generally in the second direction DR2) to the data driving circuit 720. The second direction DR2 may be, for example, a direction crossing from the upper side to the lower side of the display panel 710, but embodiments of the present disclosure are not limited thereto.

The plurality of scan lines SL1 to SLn may extend in one direction from the display panel 710. The one direction may be, for example, the first direction DR1. The plurality of scan lines SL1 to SLn may extend in the first direction DR1 from the display panel 710 (for example, generally in the first direction DR1) to the scan driving circuit 730. The first direction DR1 may be a different direction from the second direction DR2, but embodiments of the present disclosure are not limited thereto. The first direction DR1 may be, for example, a direction crossing from the left side to the right side of the display panel 710.

The data driving circuit 720 may be configured to supply data voltages to the plurality of data lines DL1 to DLm. The data driving circuit 720 may generate data voltages based on second image data DATA2 and a data driving circuit control signal DCS, and the data driving circuit 720 may output the generated data voltages to the plurality of data lines DL1 to DLm according to timing. The data driving circuit control signal DCS may include, for example, a source start pulse (SSP) signal, a source shift clock (SSC) signal, a source output enable (SOE) signal, etc. that controls the timing for output of the generated data voltages.

The data driving circuit 720 may be implemented as an integrated circuit (for example, a source driver integrated circuit (SDIC)) formed separately from the display panel 710, or the data driving circuit 720 may be formed together with the display panel 710 and formed in at least a portion of the non-display area NDA of the display panel 110.

The scan driving circuit 730 is configured to output a scan signal to the plurality of scan lines SL1 to SLn in response to a scan driving circuit control signal SCS. The scan driving circuit control signal SCS may include a start signal indicating the start of a frame, a horizontal synchronization signal for outputting a scan signal in accordance with the timing at which a data voltage is applied, and the like.

The light-emitting driving circuit 740 is configured to output a light-emitting control signal to the plurality of light-emitting control lines EML1 to EMLn in response to a light-emitting driving circuit control signal ECS. The light-emitting driving circuit control signal ECS may include a start signal indicating the start of a frame, a horizontal synchronization signal for outputting a light-emitting control signal in accordance with the timing at which a data voltage is applied, etc.

The scan driving circuit 730 and/or the light-emitting driving circuit 740 may be implemented as an integrated circuit (e.g., a gate driving integrated circuit (GDIC)) formed separately from the display panel 710 or may be formed together with the display panel 710 and formed in at least a portion of the non-display area NDA of the display panel 710.

The power supply circuit 750 may be configured to output one or more power voltages having constant voltage levels. The power supply circuit 750 may output a power voltage supplied to the display panel 710 (for example, a first power voltage ELVDD, a second power voltage ELVSS, a third power voltage VINT, an anode initialization voltage (for example, a first anode initialization voltage VAINT1, a second anode initialization voltage VAINT2), etc.). According to an embodiment, the power supply circuit 750 may output a voltage supplied to the scan driving circuit 730 (for example, a gate high voltage, a gate low voltage, etc.). According to an embodiment, the power supply circuit 750 may output a voltage supplied to the data driving circuit 720 (for example, a gamma voltage, a reference voltage, etc.). The power supply circuit 750 may include, for example, a regulator (for example, a low dropout (LDO) regulator, etc.). The power supply circuit 750 may be implemented as, for example, a power management integrated circuit (PMIC). The power supply circuit 750 may be configured to output power voltages to power lines in response to a power supply circuit control signal VCS.

The timing controller 760 may be configured to control the data driving circuit 720, the scan driving circuit 730, the light-emitting driving circuit 740, the power supply circuit 750, etc. Based on a control signal CS (e.g., a synchronization signal, a clock signal, a data enable signal, etc.) input through a host HST, the timing controller 760 may generate and output the control signals DCS, SCS, ECS, and VCS for controlling the data driving circuit 720, the scan driving circuit 730, the light-emitting driving circuit 740, and the power supply circuit 750. According to an embodiment, the timing controller 760 may generate a synchronization signal, a data enable signal, and the like therein based on the control signal CS (e.g., information on a driving frequency (or frame rate) of an image displayed on the display panel 710) received through the host HST.

The timing controller 760 may receive first image data DATA1 from the host HST and align the input first image data DATA1 in pixel row units. The timing controller 760 may convert the input first image data DATA1 according to a preset interface (e.g., low voltage differential signaling (LVDS), a display port (DP), an embedded display port (eDP), etc.). The second image data DATA2 that the timing controller 760 outputs to the data driving circuit 720 may be converted within the timing controller 760 according to the preset interface.

According to an embodiment, the timing controller 760 may be a logic circuit disposed in the display device 700. According to an embodiment, the timing controller 760 may be a processor disposed in the display device 700. The timing controller 760 may include one or more memories (e.g., registers, etc.).

The host HST, which provides the first image data DATA1, may include a set-top box, an application processor (AP), etc. In an embodiment, the host HST may be a component external to the display device 700 that is not included in the display device 700. In an embodiment, the host HST may be mounted within the display device 700. Transmission and reception of the first image data DATA1 and the control signal CS may be performed between the host HST and the display device 700 through an interface. The interface may be, for example, a serial programming interface (SPI), an inter integrated circuit (I2C), a mobile industry processor interface (MIPI), etc. However, embodiments of the present disclosure are not limited thereto.

The electronic device 100 according to an embodiment of the present disclosure may include the display device 700 and the host HST.

FIG. 7 shows circuits that supply signals, voltages, etc., to the display panel 710 in FIG. 7 as separate according to function, but such circuits may be variously combined or arranged. For example, the data driving circuit 720 and the timing controller 760 may be formed within a single integrated circuit. The data driving circuit 720 and the timing controller 760 may similarly be functional units within a single integrated circuit within the display device 700.

The display device 700 according to an embodiment of the present disclosure may be used as a display screen in various products, e.g., electronic devices, such as a mobile phone, a smart phone, a tablet personal computer (PC), a smart watch, a watch phone, a mobile communication terminal, an electronic notebook, an electronic book, a portable multimedia player (PMP), a navigation, an ultra-mobile personal computer (UMPC), and the like, as well as a television, a laptop, a monitor, a billboard, an Internet of Things (IoT) device, and the like.

Figure 8:
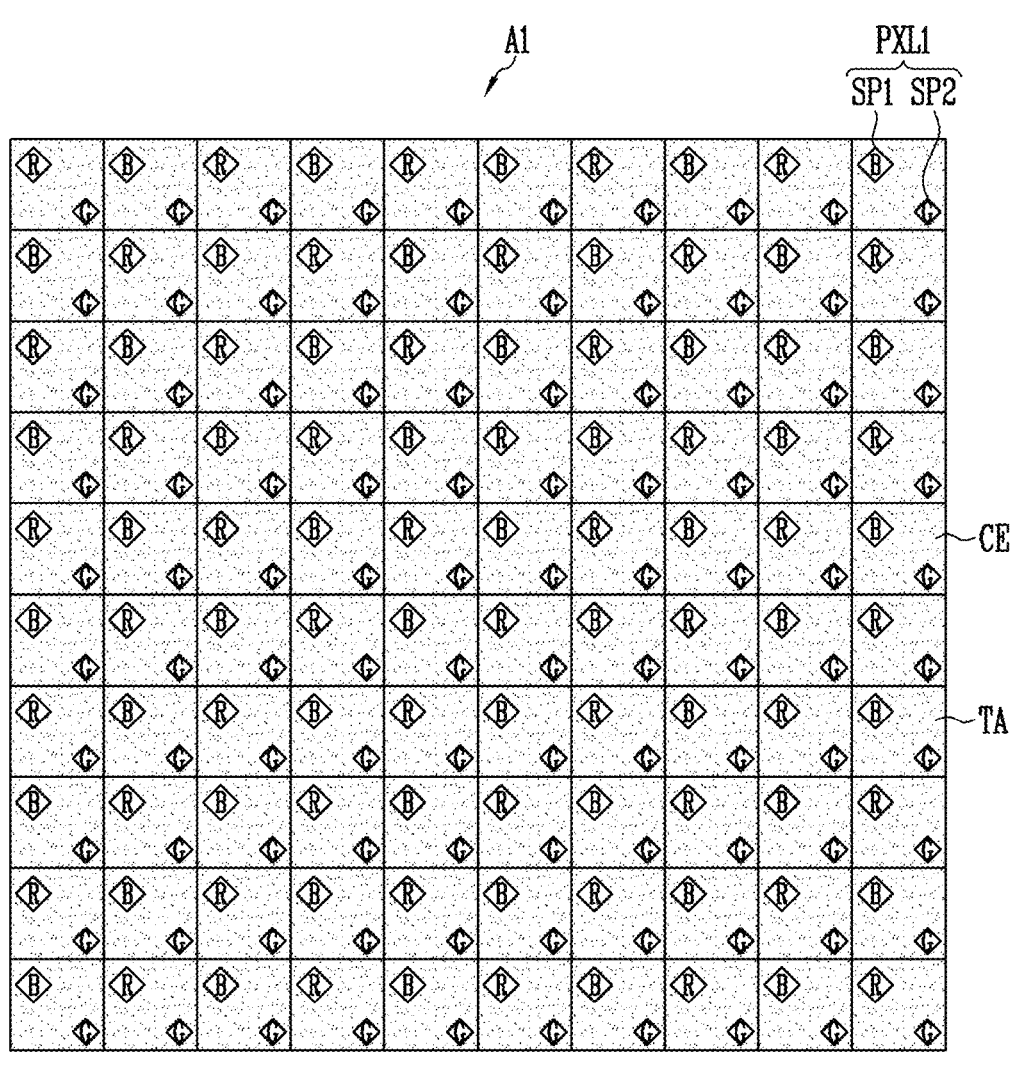
FIG. 8 is a plan view schematically illustrating a first display area according to an embodiment of the present disclosure.
Figure 8:
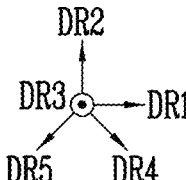

FIG. 8 is a plan view schematically illustrating a first display area A1 according to an embodiment of the present disclosure.

Referring to FIG. 8, the first display area A1 is an area of a display area DA, where a plurality of first pixels PXL1 may be disposed.

Each first pixel PXL1 may include at least one sub-pixel. For example, each first pixel PXL1 may include two sub-pixels SP1, SP2. The first sub-pixel SP1 may be a red sub-pixel R that emits red light or a blue sub-pixel B that emits blue light, and the second sub-pixel SP2 may be a green sub-pixel G that emits green light. However, the present disclosure is not limited thereto, and according to an embodiment, the first sub-pixel SP1 may be a green sub-pixel G that emits green light, and the second sub-pixel SP2 may be a red sub-pixel R that emits red light or a blue sub-pixel B that emits blue light.

The display area A1 may include a plurality of first columns and a plurality of second columns. Each first column contains a plurality of the first sub-pixels SP1. In particular, a first sub-pixel SP1 composed of a red sub-pixel R and a first sub-pixel SP1 composed of a blue sub-pixel B may be interleaved or alternately disposed along a second direction DR2, for example, a vertical direction or a column direction, to form a first pixel column. For example, a first of the first pixel columns may include, in a top-down order in FIG. 8, a first sub-pixel SP1 composed of a red sub-pixel R, a first sub-pixel SP1 composed of a blue sub-pixel B, a first sub-pixel SP1 composed of a red sub-pixel R, a first sub-pixel SP1 composed of a blue sub-pixel B, a first sub-pixel SP1 composed of a red sub-pixel R, and so on. Each second column contains a plurality of the second sub-pixels SP2. In particular, a plurality of the second sub-pixel SP2, each composed of a green sub-pixel G, may be disposed along the second direction DR2 to form a second pixel column. In other words, each second pixel column may include in a top-down order a second sub-pixel SP2 composed of a green sub-pixel G, a second sub-pixel SP2 composed of a green sub-pixel G, a second sub-pixel SP2 composed of a green sub-pixel G, and so on.

In an embodiment of the present disclosure, the arrangement order of the sub-pixels in the first pixel columns may be different in different first columns. For example, one of the first pixel columns may include, in the top-down order, a first sub-pixel SP1 composed of a red sub-pixel R, a first sub-pixel SP1 composed of a blue sub-pixel B, a first sub-pixel SP1 composed of a red sub-pixel R, a first sub-pixel SP1 composed of a blue sub-pixel B, and so on, and the next of the first pixel columns may include, in the top-down order, a first sub-pixel SP1 composed of a blue sub-pixel B, a first sub-pixel SP1 composed of a red sub-pixel R, a first sub-pixel SP1 composed of a blue sub-pixel B, a first sub-pixel SP1 composed of a red sub-pixel R, and so on.

The first pixel columns and the second pixel columns may be disposed alternately along a first direction DR1, for example, in the horizontal direction or the row direction.

In the first display area A1, centering around one second sub-pixel SP2 composed of a green sub-pixel G, two first sub-pixels SP1 composed of a red sub-pixel R and two first sub-pixels SP1 composed of a blue sub-pixel B may be adjacent in diagonal directions. For example, two first sub-pixels SP1 composed of a blue sub-pixel B may be adjacent along a fourth direction DR4 centered on one second sub-pixel SP2. The fourth direction DR4 may be, for example, a direction rotated 45° clockwise from the first direction DR1. Similarly, two first sub-pixels SP1 composed of a red sub-pixel R may be adjacent along a fifth direction DR5 centered on one second sub-pixel SP2. The fifth direction DR5 may be, for example, a direction rotated 90° clockwise from the fourth direction DR4.

Two first sub-pixels SP1 composed of red sub-pixels R and two first sub-pixels SP1 composed of blue sub-pixels B may face each other or be at corners of a square with one second sub-pixel SP2 composed of a green sub-pixel G at the center. Each of the first and second sub-pixels SP1, SP2 may have a rhombus structure and may be formed with the same or similar areas. However, the present disclosure is not limited thereto, and the first and second sub-pixels SP1, SP2 may have different structures, and some of the first and second sub-pixels SP1, SP2 may have a smaller or larger light-emitting area or size than the remaining sub-pixels. FIG. 8 illustrates an example in which the first sub-pixel SP1 and the second sub-pixel SP2 have different areas (or sizes).

In an embodiment of the present disclosure, a plurality of first pixels PXL1 may be disposed in the first display area A1. Predetermined numbers of these first pixels PXL1 may be arranged with a predetermined spacings along the first direction DR1 and the second direction DR2 according to the resolution of a display panel DP. A combination of sub-pixels in each first pixel PXL1 may be used to produce light that appears white or a desired color.

In the first display area A1, the first pixels PXL1 including the first and second sub-pixels SP1, SP2 respectively may be disposed at a first density. The first density may be, for example, a density in which the first pixels PXL1 are densely disposed in the first display area A1 such that the entire area of the first display area A1 and the area in which the first pixels PXL1 are disposed are substantially the same. Here, the first density may be defined as the total number of the first pixels PXL1 per unit area of the first display area A1 or as the number of the first pixels per length along a row or column (PPI: pixel per inch).

Each of the first and second sub-pixels SP1, SP2 may include a light-emitting element that emits light and a sub-pixel circuit including at least one transistor for driving the light-emitting element. The sub-pixel circuits of each of the first and second sub-pixels SP1, SP2 may have substantially similar or identical structures. Accordingly, for the convenience of explanation, FIG. 9 shows an equivalent circuit diagram of an embodiment of a sub-pixel SP, which may be a sub-pixel SP1 or SP2 included in a first pixel PXL1.

Figure 9:
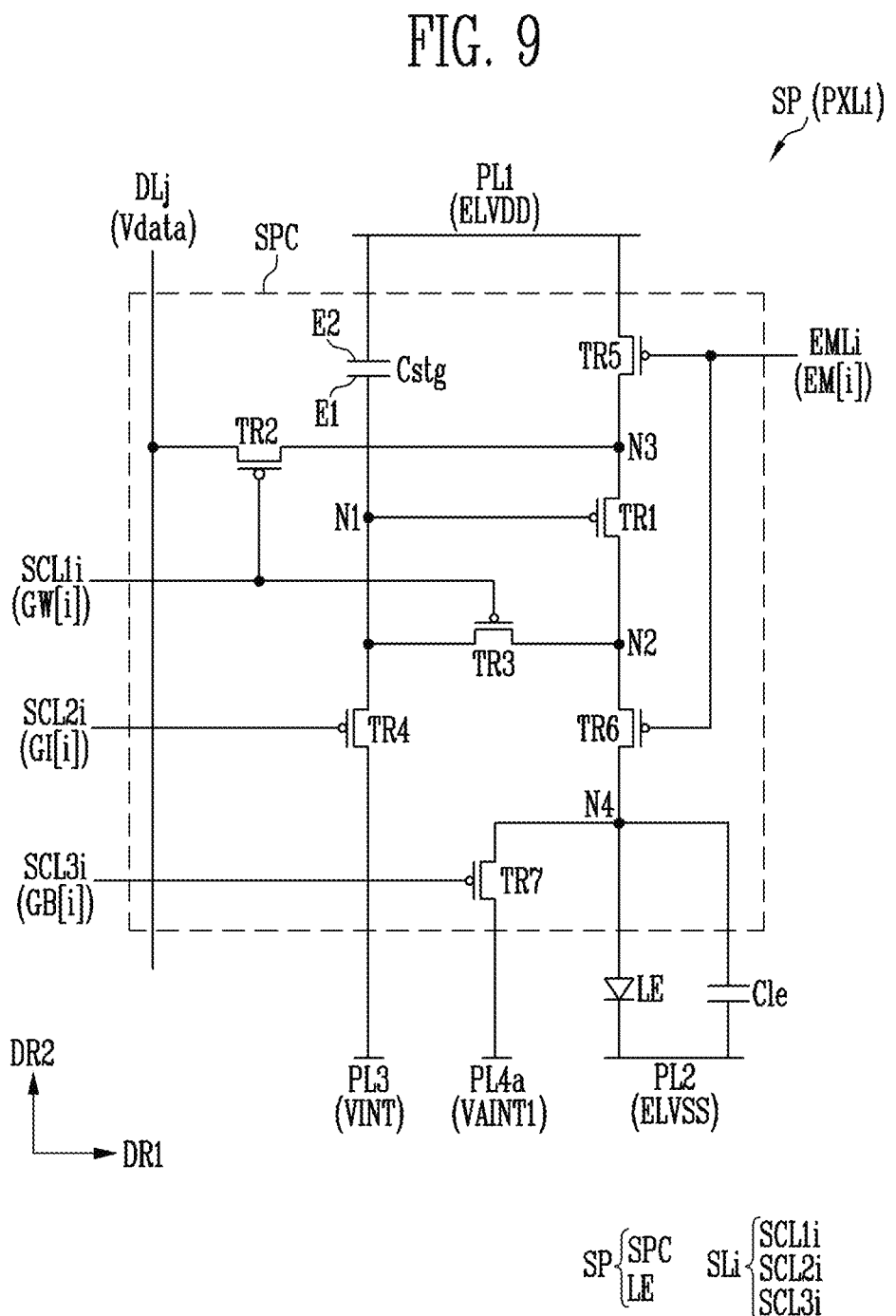
FIG. 9 is an equivalent circuit diagram for an embodiment of a sub-pixel in a first pixel.

Referring to FIG. 9, a sub-pixel SP according to an embodiment of the present disclosure may include a sub-pixel circuit SPC and a light-emitting element LE.

The sub-pixel circuit SPC may be connected to an $i^{th}$ scan line SLi (hereinafter, referred to as scan line SLi), an $i^{th}$ light-emitting control line EMLi (hereinafter, referred to as light-emitting control line EMLi), and a $j^{th}$ data line DLj (hereinafter, referred to as data line DLj).

The scan line SLi may include two or more sub-scan lines. Referring to FIG. 9, the scan line SLi may include an $i^{th}$ first sub-scan line SCL1$i$ (also referred to herein as the first sub-scan line SCL1$i$), an $i^{th}$ second sub-scan line SCL2$i$ (also referred to herein as the second sub-scan line SCL2$i$), and an $i^{th}$ third sub-scan line SCL3$i$ (also referred to herein as the third sub-scan line SCL3$i$).

The sub-pixel circuit SPC according to an embodiment of the present disclosure may include a plurality of switching elements. For the example illustrated in FIG. 9, the sub-pixel circuit SPC may include first to seventh transistors TR1 to TR7. The sub-pixel circuit SPC may also include at least one storage element. The storage element may be implemented as, for example, a capacitor. For example, the sub-pixel circuit SPC according to the embodiment illustrated in FIG. 9 may include a storage capacitor Cstg.

The first transistor TR1 may be configured to control the magnitude of a current (e.g., a driving current) supplied to the light-emitting element LE. The first transistor TR1 may include a gate electrode connected to a first node N1, a first electrode connected to a third node N3, and a second electrode connected to a second node N2. The magnitude of a current flowing in the first transistor TR1 may be determined according to the magnitude of a voltage applied to the first node N1. The first electrode of the first transistor TR1 may be one of a source electrode and a drain electrode (e.g., a drain electrode), and the second electrode may be the other one of the source electrode and the drain electrode (e.g., a source electrode). The first transistor TR1 may be referred to as a driving transistor.

The second transistor TR2 may be configured to write a data voltage Vdata to the sub-pixel circuit SPC. The second transistor TR2 may be configured to switch the electrical connection between the data line DLj and the third node N3. The second transistor TR2 may include a gate electrode connected (e.g., electrically connected) to the first sub-scan line SCL1$i$. The second transistor TR2 may electrically connect between the data line DLj and the third node N3 in response to a first scan signal GW[i] applied to the first sub-scan line SCL1$i$ (for example, the first scan signal GW[i] having the turn-on level). The second transistor TR2 may be referred to as a scan transistor.

The third transistor TR3 may be configured to switch an electrical connection between the first node N1 and the second node N2. The third transistor TR3 may be used to compensate for a change in a characteristic (for example, a threshold voltage) of the first transistor TR1. The third transistor TR3 may include a gate electrode connected to the first sub-scan line SCL1$i$. The third transistor TR3 may electrically connect between the first node N1 and the second node N2 in response to the first scan signal GW[i] applied to the first sub-scan line SCL1$i$ (for example, the first scan signal GW[i] having the turn-on level). When the third transistor TR3 is turned on, the first transistor TR1 may be diode connected. The third transistor TR3 may be referred to as a compensation transistor.

The fourth transistor TR4 may be configured to switch an electrical connection between the first node N1 and a third power line PL3. The fourth transistor TR4 may include a gate electrode connected to the second sub-scan line SCL2$i$. The fourth transistor TR4 may electrically connect between the first node N1 and the third power line PL3 in response to a second scan signal GI[i] applied to the second sub-scan line SCL2$i$ for example, the second scan signal GI[i] having the turn-on level. When the fourth transistor TR4 is turned on, a third power voltage VINT applied to the third power line PL3 may be applied to the first node N1. The fourth transistor TR4 may be referred to as a first initialization transistor.

The fifth transistor TR5 may be configured to switch an electrical connection between a first power line PL1 and the third node N3. The fifth transistor TR5 may include a gate electrode connected to the light-emitting control line EMLi. The fifth transistor TR5 may electrically insulate the first power line PL1 and the third node N3 in response to a light-emitting control signal EM[i] applied to the light-emitting control line EMLi (for example, the light-emitting control signal EM[i] having a turn-off level). When the fifth transistor TR5 is turned on, a first power voltage ELVDD applied to the first power line PL1 may be applied to the third node N3. The fifth transistor TR5 may be referred to as a first light-emitting control transistor.

The sixth transistor TR6 may be configured to switch an electrical connection between the second node N2 and a fourth node N4. The sixth transistor TR6 may include a gate electrode connected to the light-emitting control line EMLi. The sixth transistor TR6 may electrically insulate between the second node N2 and the fourth node N4 in response to the light-emitting control signal EM[i] applied to the light-emitting control line EMLi (for example, the light-emitting control signal EM[i] having the turn-off level). When the sixth transistor TR6 is turned on, the second node N2 and the fourth node N4 may be electrically connected. The sixth transistor TR6 may be referred to as a second light-emitting control transistor.

The seventh transistor TR7 may be configured to switch the electrical connection between the fourth node N4 and a 4a$^{th}$ power line PL4$a$. The seventh transistor TR7 may include a gate electrode connected to the third sub-scan line SCL3$i$. The seventh transistor TR7 may electrically connect between the fourth node N4 and the 4a$^{th}$ power line PL4$a$ in response to a third scan signal GB[i] applied to the third sub-scan line SCL3$i$ (for example, the third scan signal GB[i] having the turn-on level). When the seventh transistor TR7 is turned on, a first anode initialization voltage VAINT1 applied to the 4a$^{th}$ power line PL4$a$ may be applied to the fourth node N4. The seventh transistor TR7 may be referred to as a first anode initialization transistor or as a second initialization transistor.

The storage capacitor Cstg may be configured to maintain a magnitude of a voltage applied to the first node N1. The storage capacitor Cstg may include one electrode E1 connected to the first node N1 and another electrode E2 connected to the first power line PL1. The storage capacitor Cstg may be configured to maintain a potential difference between the first node N1 and the first power line PL1.

The light-emitting element LE may include a first electrode connected to the fourth node N4, a second electrode connected to the second power line PL2, and a light-emitting layer located between the first electrode and the second electrode. The first electrode may be one of an anode electrode and a cathode electrode, and the second electrode may be the other one of the cathode electrode and the anode electrode. For convenience of explanation, the following description will assume that the first electrode is the anode electrode and the second electrode is the cathode electrode. The first electrode (e.g., the anode electrode) of the light-emitting element LE may be connected (e.g., electrically connected) to the first power line PL1 via the sub-pixel circuit SPC. The second electrode (e.g., the cathode electrode) of the light-emitting element LE may be connected to the second power line PL2. A second power voltage ELVSS may be applied to the second power line PL2.

In the equivalent circuit diagram of FIG. 9, the light-emitting element LE may include a capacitor component Cle. The capacitor component Cle may correspond to the capacitance between the anode electrode of the light-emitting element and the cathode electrode of the light-emitting element with the light-emitting layer located between the anode electrode and the cathode electrode as an insulating layer.

In an embodiment of the present disclosure, the magnitudes of the first anode initialization voltage VAINT1 and the second power voltage ELVSS may be the same or substantially the same. Since the first pixel PXL1 is not located to overlap with the sensor SR (see FIG. 6), there is a relatively low possibility that the sensor SR will increase the temperature of the area where the light-emitting element LE is located. Therefore, the capacitor component Cle of the light-emitting element LE may be charged relatively constantly regardless of the driving of the sensor SR. That is, the capacitance of the capacitor component Cle may be relatively constant and independent of the driving of the sensor SR.

Figure 10:
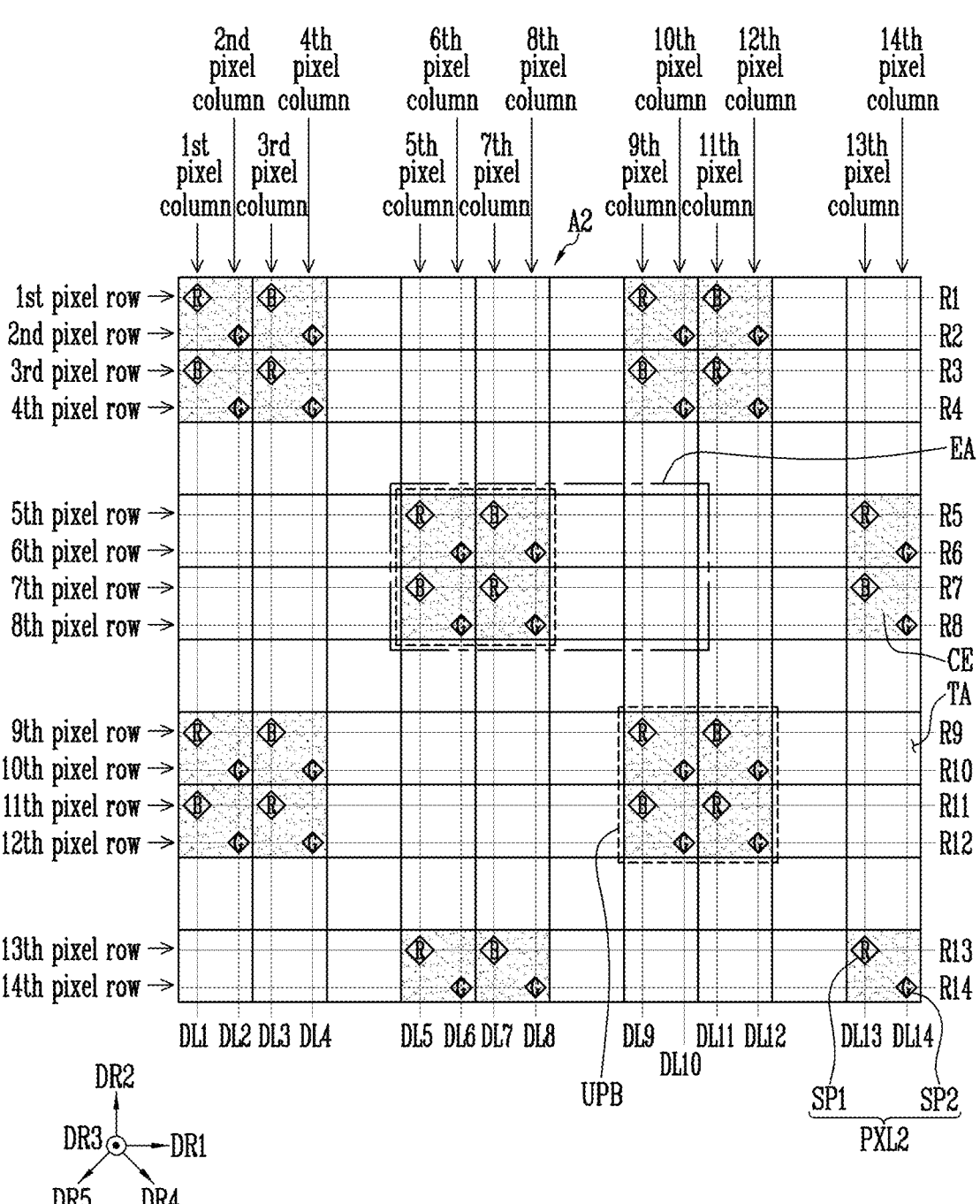
FIG. 10 is a plan view schematically illustrating a second display area according to an embodiment of the present disclosure.
Figure 11:
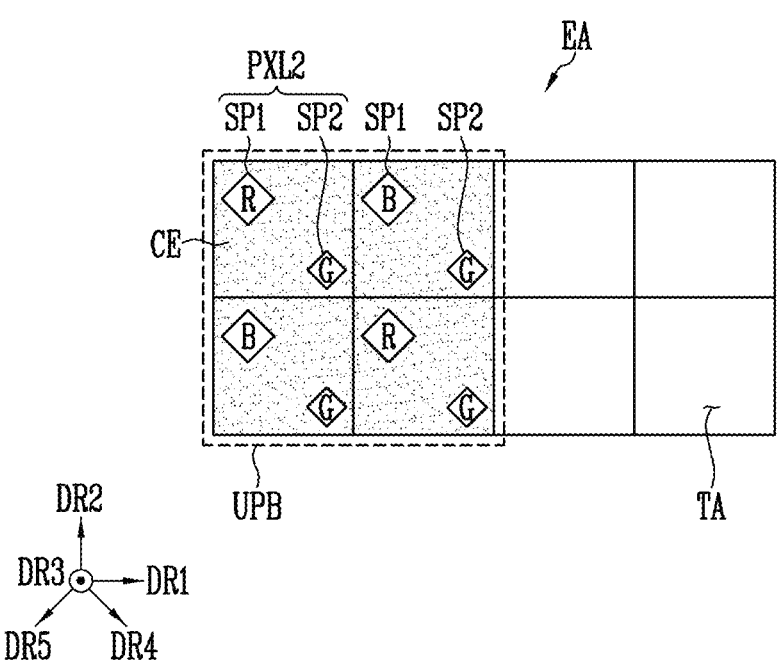
FIG. 11 is a schematic plan view showing an enlarged view of a portion EA of FIG. 10.
Figure 12:
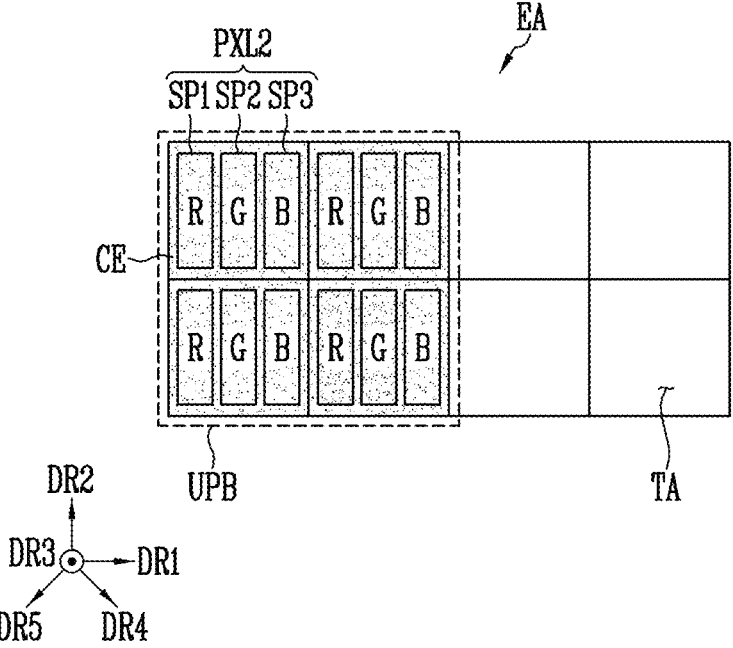
FIGS. 12 and 13 show modifications of the embodiment of FIG. 11.
Figure 13:
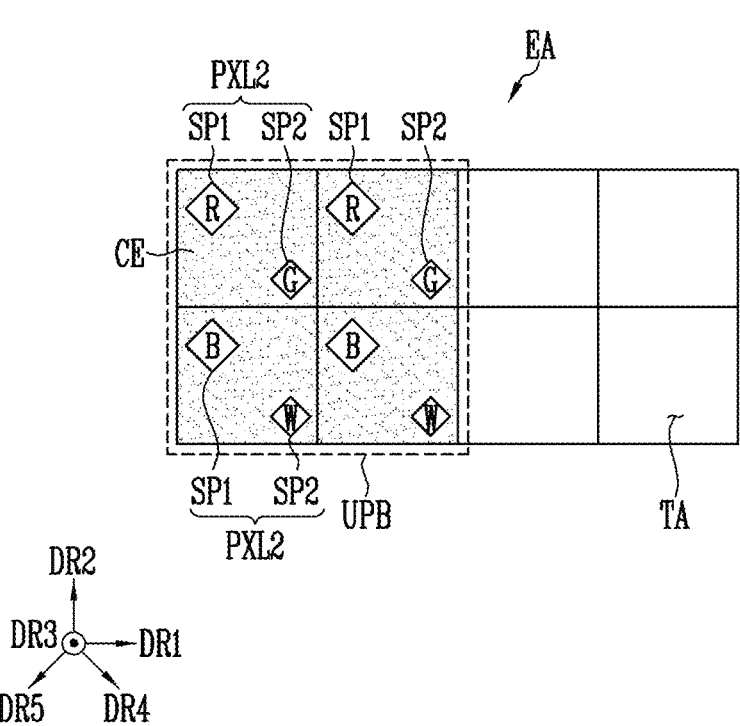

FIG. 10 is a plan view schematically illustrating a second display area A2 according to an embodiment of the present disclosure. FIG. 11 is an enlarged plan view an area EA within the second display area A2 of FIG. 10. FIGS. 12 and 13 are schematic plan views of alternate embodiments of the area EA.

FIG. 10 schematically illustrates row lines R1 to R14 and data lines DL1 to DL14 disposed in the second display area A2. Here, the row lines R1 to R14 may correspond to some of the scan lines SL1 to SLn and the light-emitting control lines EML1 to EMLn described above and illustrated in FIG. 7.

The display area DA as shown in FIG. 3 may include the first display area A1 and the second display area A2 in which pixels PXL1 and PXL2 are respectively disposed at different densities. In particular, FIG. 8 shows the first pixels PXL1 may have a first density in the first display area A1, and FIG. 10 shows the second pixels PXL2 may have a second density in the second display area A2. The second density may be lower than the first density. The following description of FIG. 10 further references FIGS. 8 and 9, which are described above.

In an embodiment of the present disclosure, the density (or pixel density) may be defined as a ratio (%) of an area that pixels PXL1 or PXL2 occupy compared to the entire area of a corresponding display area A1 or A2. The area that pixels PXL1 or PXL2 occupy may be the sum total of the areas of each of the pixels PXL1 or PXL2. The area of each pixel PXL1 or PXL2 may mean an area of a region including the sub-pixel circuit SPC, the plurality of scan lines connected to the sub-pixel circuit SPC, the plurality of light-emitting control lines, the plurality of power lines, and the light-emitting element LE. According to an embodiment, the area of each pixel PXL1 or PXL2 may mean the area of the light-emitting surface of the light-emitting element LE, for example, the size of the light-emitting area that emits light from the pixel PXL1 or PXL2. For example, the area of each pixel PXL1, PXL2 may be the area of the first electrode (for example, the anode electrode) included in the light-emitting element LE or the area of the light-emitting layer.

In the embodiments described below, the first density is defined as the ratio of the area that the first pixels PXL1 occupy in the first display area A1 to the total area of the first display area A1, and the second density is defined as the ratio of the area that the second pixels PXL2 occupy in the second area A2 to the total area of the second display area A2.

The percentage of the total area of the second display area A2 occupied by the second pixels may be smaller than the percentage of the total area of the first display area A1 occupied by the first pixels PXL1. For example, the first density of the first pixels PXL1 may be about three to five times greater than the second density of the second pixels PXL2. Since the second pixels PXL2 are disposed at a relatively low density in the second display area A2, the transmittance, for example, the light transmittance, of the second display area A2 may be higher than the light transmittance of the first display area A1.

In the first display area A1 and the second display area A2, the pixels PXL1 and PXL2 may emit light at different luminances. For example, in the first display area A1, the first pixels PXL1 may emit light at a first luminance, and in the second display area A2, the second pixels PXL2 may emit light at a second luminance. Since the second pixels PXL2 are disposed at a lower density than the first pixels PXL1, the second pixels PXL2 may be set to emit light with a higher luminance than the first pixels PXL1 so that the boundary between the first display area A1 and the second display area A2 is not easily recognized by the user. In an embodiment, the relationship between the first luminance of the first pixels PXL1 and the second luminance of the second pixels PXL2 may be inversely proportional to the density relationship. For example, the second luminance of the second pixels PXL2 may be about three to five times higher than the first luminance of the first pixels PXL1.

The second display area A2 may include a plurality of pixel rows and a plurality of pixel columns. In an embodiment, each pixel row includes pixels (or sub-pixels) disposed along a first direction DR1. Each pixel column includes pixels (or sub-pixels) disposed along a second direction DR2. Each of the row lines R1 to R14 may connect to all the pixels (or sub-pixels) included in the corresponding pixel row. The pixels (or sub-pixels) in one pixel row may be connected to different data lines DL1 to DL14. Each of the data lines DL1 to DL1 may connect to all the pixels (or sub-pixels) included in the corresponding pixel column. The pixels (or sub-pixels) in one pixel column may be connected to different row lines R1 to R14.

The configuration of the first pixels PXL1 of the first display area A1 and the configuration of the second pixels PXL2 of the second display area A2 may be different. For example, the material of signal lines (e.g., scan lines, light-emitting control lines, power lines, etc.) connected to the first pixels PXL1 of the first display area A1 and the material of signal lines connected to the second pixels PLX2 of the second display area A2 may be different. For example, the signal lines connected to the first pixels PXL1 of the first display area A1 may be composed of an opaque material, e.g., opaque metal, and the signal lines connected to the second pixels PXL2 of the second display area A2 may be composed of a material having high light transmittance, e.g., transparent metal. According to an embodiment, the signal lines connected to the pixels PXL1 and PXL2 in the first display area A1 and the second display area A2 may be composed of one of an opaque metal and a transparent metal, and the percentage of signal lines in the second display area A2 that are composed of the transparent metal may be higher than the percentage of signal lines in the first display area A1 that are composed of the transparent metal. In an embodiment of the present disclosure, the light transmittance of the transparent metal may be higher than the light transmittance of an opaque metal, for example, a reflective metal.

As another example, the material of the first electrode AE of the light-emitting element LE included in the first pixels PXL1 of the first display area A1 and the material of the first electrode AE of the light-emitting element LE included in the second pixels PXL2 of the second display area A2 may be different. For example, the first electrode AE of the light-emitting element LE included in the first pixels PXL1 of the first display area A1 may be composed of an opaque material, e.g., opaque metal, and the first electrode AE of the light-emitting element LE included in the second pixels PXL2 of the second display area A2 may be composed of a transparent material, e.g., transparent metal. According to an embodiment, the first electrodes (e.g., anode electrodes) of the pixels PXL1 and PXL2 in the first display area A1 and the second display area A2 are composed of one of an opaque metal and a transparent metal, and the percentage of the first electrodes composed of the transparent metal in the second display area A2 may be higher than the percentage of the first electrodes composed of the transparent metal in the first display area A1.

As another example, the ratio of the area of the second electrodes (e.g., cathode electrodes) of the light-emitting elements LE included in the first pixels PXL1 in the first display area A1 to the total area of the first display area A1 and the ratio of the area of the second electrodes of the light-emitting elements LE included in the second pixels PXL2 in the second display area A2 to the total area of the second display area A2 may be different. For example, the second electrodes of the light-emitting elements LE included in the second pixels PXL2 of the second display area A2 may occupy a smaller percentage of the area of the second display area A2 than does the area of the second electrodes of the light-emitting elements LE in the first pixels PXL1 in the first display area A1.

As another example, the layout of the first pixels PXL1 (for example, the disposition relationship of components included in the sub-pixel circuit SPC) and the layout of the second pixels PXL2 may be different. For example, the signal lines connected to the second pixels PXL2 may be designed to be narrower than the signal lines connected to the first pixels PXL1, or the signal lines connected to the second pixels PXL2 may be disposed to overlap with an insulating layer therebetween. Accordingly, the average spacing of the signal lines in the second display area A2 may be preserved, while the area occupied by the signal lines is reduced, so that the light transmittance of the second display area A2 may be improved.

Each of the second pixels PXL2 may include a first sub-pixel SP1 and a second sub-pixel SP2 as shown in FIG. 10. The first sub-pixel SP1 may be a red sub-pixel R that emits red light or a blue sub-pixel B that emits blue light, and the second sub-pixel SP2 may be a green sub-pixel G that emits green light. Each of the second pixels PXL2 may emit light that appears white or a desired color by combining light emitted from each of the first and second sub-pixels SP1 and SP2. In the above-described embodiment, the first and second sub-pixels SP1 and SP2 are described as configuring one second pixel PXL2, but the present disclosure is not limited thereto. According to an embodiment, one second pixel PXL2 may be configured to include three, four, or more sub-pixels.

According to an embodiment, each of the second pixels PXL2 may include first to third sub-pixels SP1 to SP3 arranged in the same pixel row along the first direction DR1, as illustrated in FIG. 12. The first to third sub-pixels SP1 to SP3 may be disposed in a stripe-shaped array structure. The first sub-pixel SP1 may be a red sub-pixel R that emits red light, the second sub-pixel SP2 may be a green sub-pixel G that emits green light, and the third sub-pixel SP3 may be a blue sub-pixel B that emits blue light. In this case, the first to third sub-pixels SP1 to SP3 may be rectangular and may have the same or similar areas (or sizes).

According to another embodiment, one second pixel PXL2 may include first and second sub-pixels SP1 and SP2, as illustrated in FIG. 13. The first sub-pixel SP1 may be a red sub-pixel R that emits red light or a blue sub-pixel B that emits blue light, and the second sub-pixel SP2 may be a green sub-pixel G that emits green light or a white sub-pixel W that emits white light. The first sub-pixels SP1 may be repeatedly disposed along the second direction DR2 to form a first pixel column. For example, the first pixel column may include, in a top-down order, a first sub-pixel SP1 that is a red sub-pixel R, a first sub-pixel SP1 that is a blue sub-pixel B, and so on. The second sub-pixels SP2 may be repeatedly disposed along the second direction DR2 to form a second pixel column. For example, the second pixel column may include, in a top-down order, a second sub-pixel SP2 formed of a green sub-pixel G, a second sub-pixel SP2 formed of a white sub-pixel W, and so on.

In the second display area A2, a plurality of unit pixel blocks UPB may be repeatedly arranged at a predetermined interval. Each unit pixel block UPB may be a virtual unit block having a predetermined area that includes two second pixels PXL2 adjacent in the first direction DR1 and two second pixels PXL2 adjacent to the two second pixels PXL2 in the second direction DR2. For example, in the second display area A2, four second pixels PXL2 adjacently disposed along the first direction DR1 and the second direction DR2 may be grouped into one unit pixel block UPB.

The second display area A2 may include a transmitting area TA through which light is transmitted. In an embodiment of the present disclosure, the transmitting area TA may be an area in the second display area A2 excluding the unit pixel blocks UPB and may be a transmitting window (or transparent window) in which the second pixels PXL2 are not disposed. The transmitting area TA may function as a transmitting window through which incident light is transmitted, since metal layers of the sub-pixel circuit SPC are not disposed in the transmitting area TA. For example, organic films and/or inorganic films, which have transmitting properties, may be disposed in the transmitting area TA. In one embodiment, the transmitting area TA may be an area from which the second electrode, e.g., cathode electrode, which may have the greatest influence on light transmittance, is removed. In this case, the second electrode may be selectively disposed within the second display area A2. In other words, the second electrode may be disposed only in an area corresponding to the second pixels PXL2 in the second display area A2, and the second electrode may not be provided in the transmitting area TA around the second pixels PXL2.

According to an embodiment, the transmitting area TA may include an opening through one or more layer forming the display panel DP. The opening may minimize loss of light passing through the transmitting area TA. In an embodiment of the present disclosure, the opening may be formed by removing a portion of an insulating film corresponding to the transmitting area TA.

As described above, since the second display area A2 includes the transmitting area TA in which the second pixels PXL2 are not disposed, the light transmittance per unit area may be relatively higher than that of the first display area A1.

The second display area A2 may overlap with a sensor SR that receives or emits light. As the transmitting area TA that transmits light is provided in the second display area A2, the amount (or intensity) of light incident on the sensor SR disposed corresponding to the second display area A2 increases, so that the sensing capability (or sensing accuracy, recognition rate) of the sensor SR may be improved. Similarly, the transmitting area may improve the strength or intensity of light that sensor SR emits from the display panel DP.

Figure 14:
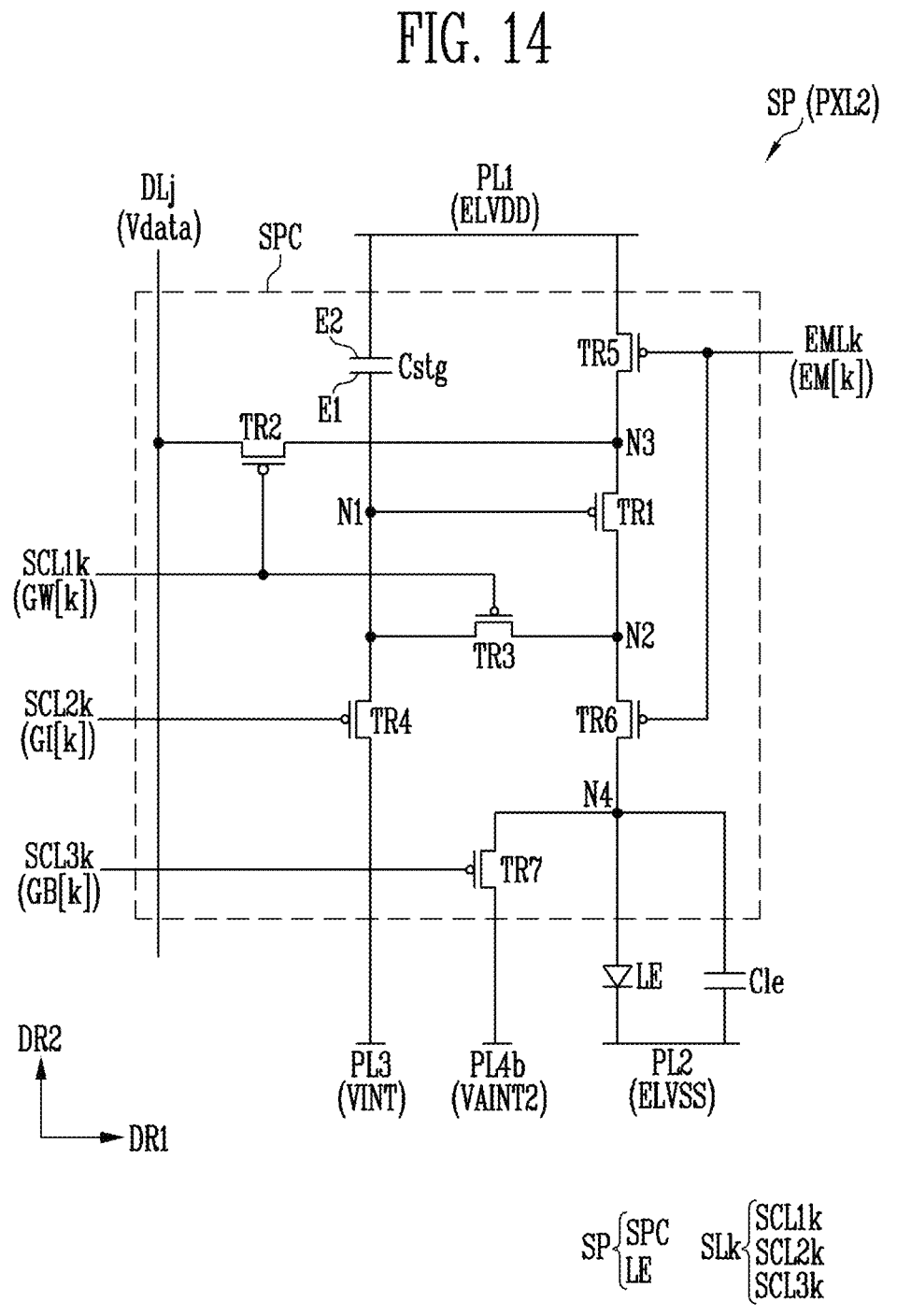

FIG. 14 is an equivalent circuit diagram according to an embodiment of a sub-pixel SP included in a second pixel PXL2.

The sub-pixel SP may be any of the sub-pixels SP1 or SP2 in a second pixel PXL2 in the second display area A2 as described above. The sub-pixel SP included in the second pixel PXL2 may include first to seventh transistors TR1 to TR7, a storage capacitor Cstg, and a light-emitting element LE.

Compared to the equivalent circuit diagram described with reference to FIG. 9, the sub-pixel SP of FIG. 14 differs in that a $k^{th}$ scan line SLk and a $4b^{th}$ power line PL4$b$ are connected to the sub-pixel SP of FIG. 14, but the remaining configuration of the embodiments of FIGS. 9 and 14 may be similar overall.

Referring to FIG. 14, the second and third transistors TR2 and TR3 may be connected to a $k^{th}$ first sub-scan line SCL1$k$ (k being an integer greater than or equal to 1). The fourth transistor TR4 may be connected to the $k^{th}$ second sub-scan line SCL2$k$. The seventh transistor TR7 may be connected to the $k^{th}$ third sub-scan line SCL3$k$. The fifth and sixth transistors TR6, TR7 may be connected to the $k^{th}$ light-emitting control line EMLk.

A first scan signal GW[k] may be applied to the $k^{th}$ first sub-scan line SCL1$k$. A second scan signal GI[k] may be applied to the $k^{th}$ second sub-scan line SCL2$k$. A third scan signal GB[k] may be applied to the $k^{th}$ third sub-scan line SCL3$k$. A light-emitting control signal EM[k] may be applied to the $k^{th}$ light-emitting control line EMLk.

The seventh transistor TR7 may be connected to the $4b^{th}$ power line PL4$b$. A second anode initialization voltage VAINT2 may be applied to the $4b^{th}$ power line PL4$b$.

Referring to FIG. 14, a length of a period required to charge a capacitor component Cle may vary depending on the light-emitting efficiency of a light-emitting layer, and the light-emitting efficiency of a light-emitting layer may vary depending on the temperature in an area where a corresponding light-emitting element LE is located. For example, the light-emitting efficiency of the light-emitting element LE at a high temperature (about 50° C.) may be lower than the light-emitting efficiency of the light-emitting element LE at room temperature (about 25° C.). Accordingly, the time required for the capacitor component Cle of the light-emitting element LE to be charged under a high temperature condition may be longer, so that the luminance of the light-emitting element LE located under the high temperature condition may be smaller than intended. As a result, a spot may be visible in the display area, which may deteriorate the display quality.

Referring further to FIG. 6, the case where the light-emitting element LE is located under the high temperature condition may be, for example, a case where a sensor SR emits infrared light under the light-emitting element LE. Embodiments of the present disclosure may supply different anode initialization voltages to a pixel located in an area overlapping with the sensor SR (for example, a second display area A2) and a pixel located in an area not overlapping with the sensor SR (for example, a first display area A1) while the sensor SR is operating. This may improve display quality.

Figure 15:
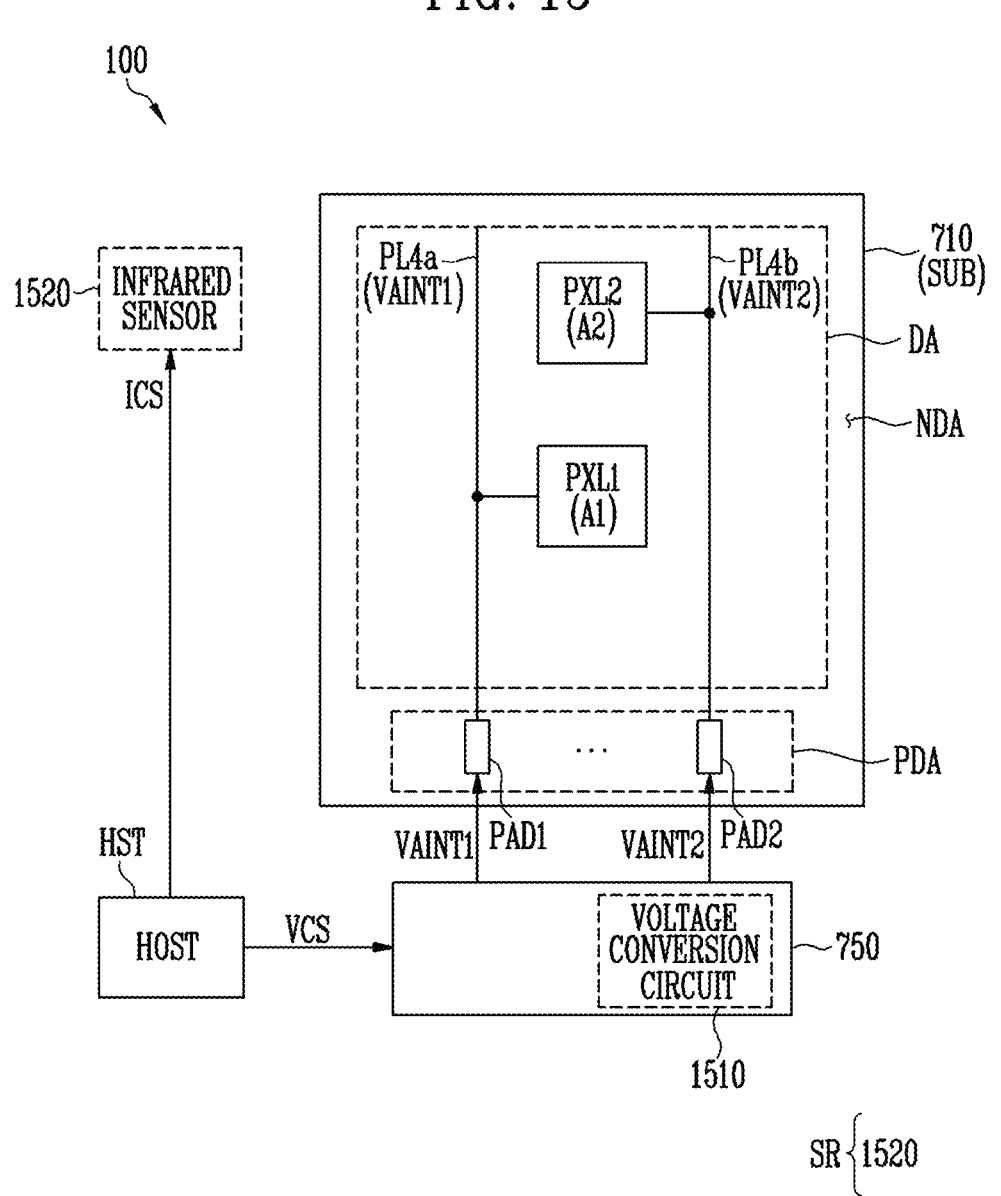
FIG. 15 is a block diagram of an embodiment of an electronic device according to embodiments of the present disclosure.

FIG. 15 is a block diagram of an electronic device 100 according to an embodiment of the present disclosure.

The embodiment of the electronic device 100 illustrated in FIG. 15 includes a sensor SR, a host HST, a power supply circuit 750, and a display panel 710, and the sensor SR is an infrared sensor 1520.

The host HST may output an infrared sensor control signal ICS for controlling the infrared sensor 1520. The infrared sensor 1520 may emit infrared light in response to the infrared sensor control signal ICS.

The host HST may also output a power supply circuit control signal VCS for controlling the power supply circuit 750. The power supply circuit 750 may change the level of a second anode initialization voltage VAINT2 in response to the power supply circuit control signal VCS.

In an embodiment, the power supply circuit 750 may include a voltage conversion circuit 1510. The voltage conversion circuit 1510 may not supply a first anode initialization voltage VAINT1 and may supply the second anode initialization voltage VAINT2. For example, the voltage conversion circuit 1510 may be electrically connected to a second pad PAD2 and electrically insulated from a first pad PAD1. The voltage conversion circuit 1510 may change the voltage level of the second anode initialization voltage VAINT2 in response to the power supply circuit control signal VCS. In an embodiment, the voltage conversion circuit 1510 may include a resistor string (or a gamma string) providing one or more voltage levels and one or more transistors for outputting a selected one of the voltage levels. However, the embodiments of the present disclosure are not limited thereto, and the voltage conversion circuit 1510 may supply both the first anode initialization voltage VAINT1 and the second anode initialization voltage VAINT2, but may change and output only the level of the second anode initialization voltage VAINT2 in response to the power supply circuit control signal VCS.

The display panel 710 may include a display area DA and a non-display area NDA. The non-display area NDA may be located around the display area DA. The display area DA may include a first display area A1 in which a first pixel PXL1 is located and a second display area A2 in which a second pixel PXL2 is located. The non-display area NDA may include a pad area PDA. A plurality of pads may be located in the pad area PDA.

The first pad PAD1 to which the first anode initialization voltage VAINT1 is applied and the second pad PAD2 to which the second anode initialization voltage VAINT2 is applied may be located in the pad area PDA. In an embodiment, the first pixel PXL1 may be connected to the first pad PAD1 through a $4a^{th}$ power line PL4$a$. The second pixel PXL2 may be connected to the second pad PAD2 through the $4b^{th}$ power line PL4$b$.

Figure 16:
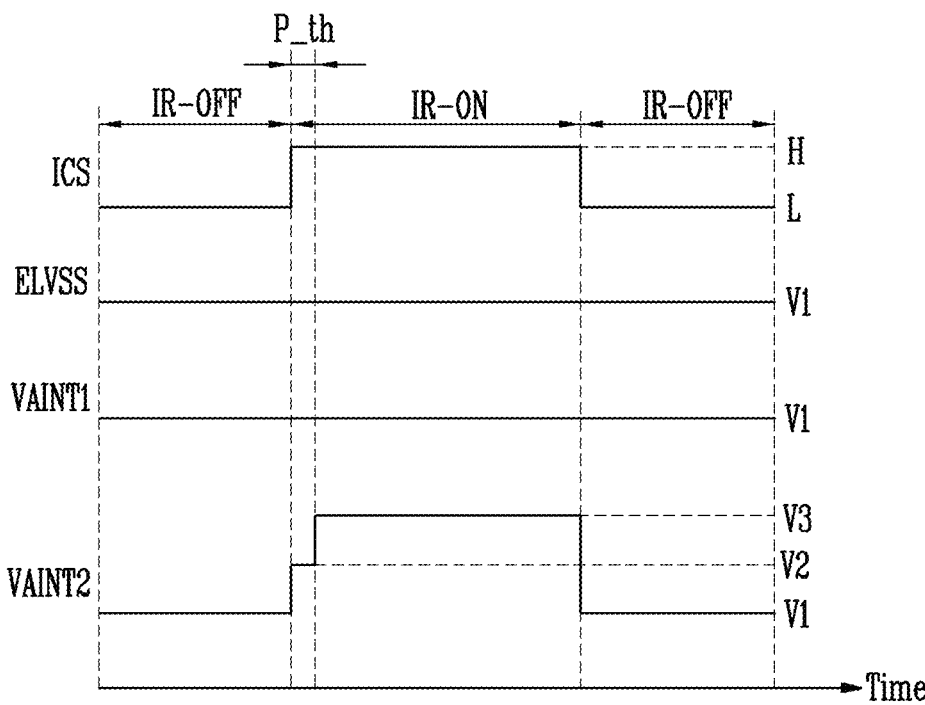
FIG. 16 is an example of a timing diagram according to an embodiment of the present disclosure.

FIG. 16 shows an example of a timing diagram according to embodiments of the present disclosure.

FIG. 16 particularly shows time dependences of levels (e.g., voltage levels) of an infrared sensor control signal ICS, a second power voltage ELVSS, a first anode initialization voltage VAINT1, and a second anode initialization voltage VAINT2 in the electronic device 100 of FIG. 15. The timing shown in FIG. 16 is further described below with reference to FIG. 15.

In an embodiment, the infrared sensor control signal ICS may have a low level L or a high level H. The low level L corresponds to a period IR-OFF in which the infrared sensor 1520 does not operate, during which time the sensor SR does not emit infrared light. The high level H corresponds to a period IR-ON in which the infrared sensor 1520 operates, during which time the sensor SR emits infrared light. However, embodiments of the present disclosure are not limited thereto, and the high level H may correspond to a period IR-OFF in which the infrared sensor 1520 does not operate, and the low level L may correspond to a period IR-ON in which the infrared sensor 1520 operates.

While the sensor SR emits infrared light, the temperature of the substrate SUB may rise, and in particular, the temperature may rise in the second display area A2, which is located to overlap in the direction in which infrared light is emitted from the sensor SR. Due to the rise in the temperature of the substrate SUB in the second display area A2, the light-emitting efficiency of the light-emitting elements located in the second display area A2 may be lowered.

In the first pixel PXL1 located in the first display area A1, since operation of the infrared sensor 1520 does not significantly change (or less significantly changes) the temperature of the substrate SUB in the surrounding area (e.g., the first display area A1), the first anode initialization voltage VAINT1 may be supplied at a first level V1. Here, the first level V1 may be equal to, or substantially equal to, the level of the second power voltage ELVSS. As a result, the phenomenon in which light is unintentionally emitted because the potential difference between the two ends of the light-emitting element becomes substantially close to 0 (also called a black out phenomenon) may be prevented.

In the second pixel PXL2 located in the second display area A2, since the temperature change of the substrate SUB in the second display area A2 is not large during the period IR-OFF in which the infrared sensor 1520 is not operating, the second anode initialization voltage VAINT2 may be supplied at the first level V1. As a result, the black out phenomenon in which light is unintentionally emitted may be prevented.

The temperature of the substrate SUB increases in the second display area A2 during the period IR-ON in which the infrared sensor 1520 operates, so that the second anode initialization voltage VAINT2, which is supplied to the second pixels PXL2 in the second display area A2, may be supplied at an increased level, which is higher than the first level V1. This change in the second anode initialization voltage VAINT2 may compensate for the problem of low light-emitting efficiency of the light-emitting element of the second pixel PXL2.

During a threshold period P_th at the beginning of the period IR-ON in which the infrared sensor 1520 operates, the temperature of the second display area A2 may increase. Then, during the period IR-ON when the infrared sensor 1520 has operated longer than the threshold period P_th, the temperature of the second display area A2 may converge to a constant temperature. For example, the length of the threshold period P_th may be less than about 1 minute. For example, the temperature of the second display area A2 may increase by about 8° C. during the threshold period P_th. However, embodiments of the present disclosure are not limited thereto.

In an embodiment, when the infrared sensor 1520 starts to operate, the voltage level of the second anode initialization voltage VAINT2 may sequentially rise from the first level V1 to a second level V2 and then to a third level V3. For example, during the threshold period P_th during the period IR-ON in which the infrared sensor 1520 operates, the second anode initialization voltage VAINT2 may be at the second level V2, and after the threshold period P_th has elapsed, the second anode initialization voltage VAINT2 may be at the third level V3. The second level V2 may be higher than the first level V1. The third level V3 may be higher than the second level V2.

When the infrared sensor 1520 stops operating, the level of the second anode initialization voltage VAINT2 may be lowered to the first level V1. For example, the level of the second anode initialization voltage VAINT2 may be lowered from the third level V3 to the first level V1. However, embodiments of the present disclosure are not limited thereto. For example, when the infrared sensor 1520 stops operating, the second anode initialization voltage VAINT2 may be lowered from the third level V3 to the second level V2, and then, e.g., after the threshold period P_th elapses, the second anode initialization voltage VAINT2 may be lowered from the second level V2 to the first level V1.

Figure 17:
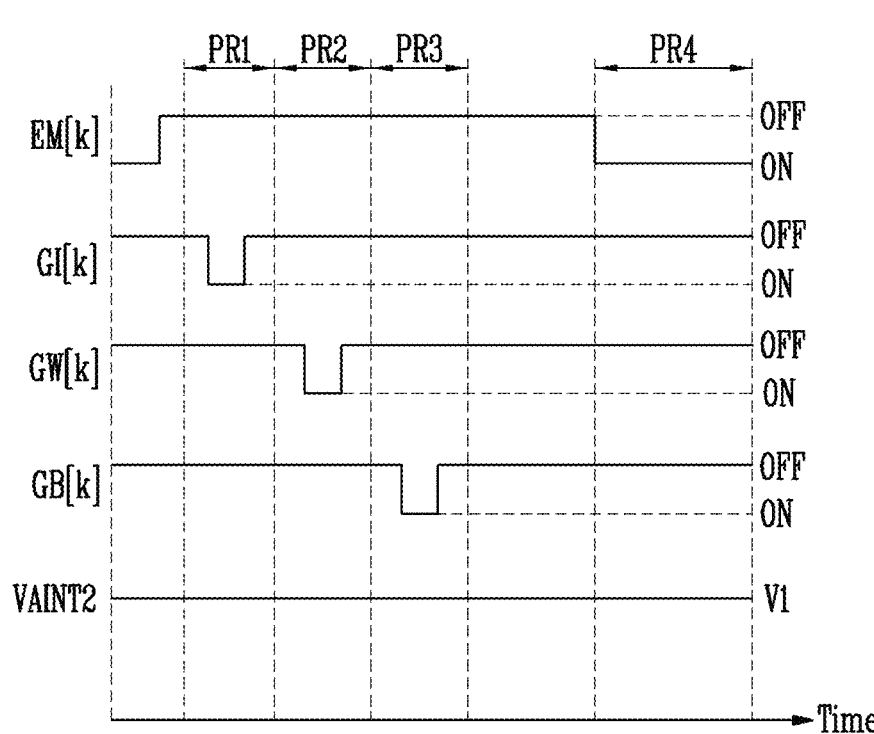
FIG. 17 is a timing diagram illustrating a method of driving a pixel according to an embodiment of the present disclosure during a period in which an infrared sensor does not operate.

FIG. 17 is a timing diagram illustrating a method of driving a pixel according to embodiments of the present disclosure during a period IR-OFF in which an infrared sensor does not operate. The timing shown in FIG. 17 is described below with reference to an equivalent circuit diagram for the sub-pixel SP shown in FIG. 14.

Referring to FIG. 17, the method of driving a pixel during a period IR-OFF in which the infrared sensor does not operate may include first to fourth periods PR1 to PR4.

In the first period PR1, the light-emitting control signal EM[k] may have a turn-off level OFF. The second scan signal GI[k] may toggle to a turn-on level ON. The first scan signal GW[k] may have a turn-off level OFF. The third scan signal GB[k] may have a turn-off level OFF. The second anode initialization voltage VAINT2 may have a first level V1. Accordingly, in the first period PR1, the third power voltage VINT may be applied to the first node N1 via the fourth transistor TR4 to initialize the voltage of the first node N1. The first period PR1 may be referred to as an initialization period.

In the second period PR2, the light-emitting control signal EM[k] may have a turn-off level OFF. The second scan signal GI[k] may have a turn-off level OFF. The first scan signal GW[k] may toggle to a turn-on level ON. The third scan signal GB[k] may have a turn-off level OFF. The second anode initialization voltage VAINT2 may have a first level V1. Accordingly, in the second period PR2, the second and third transistors TR2, TR3 may be turned on to write the data voltage Vdata to the sub-pixel SP. The second period PR2 may be referred to as a data writing period.

In the third period PR3, the light-emitting control signal EM[k] may have a turn-off level OFF. The second scan signal GI[k] may have a turn-off level OFF. The first scan signal GW[k] may have a turn-off level OFF. The third scan signal GB[k] may toggle to a turn-on level ON. The second anode initialization voltage VAINT2 may have a first level V1. Accordingly, in the third period PR3, the seventh transistor TR7 may turn on and initialize the voltage of the fourth node N4 to the second anode initialization voltage VAINT2, i.e., to the first level V1. The third period PR3 may be referred to as an anode initialization period.

In the fourth period PR4, the light-emitting control signal EM[k] may have a turn-on level ON. The second scan signal GI[k] may have a turn-off level OFF. The first scan signal GW[k] may have a turn-off level OFF. The third scan signal GB[k] may have a turn-off level OFF. The second anode initialization voltage VAINT2 may have a first level V1. Accordingly, in the fourth period PR4, the light-emitting element LE may emit light with a luminance corresponding to the data voltage Vdata written in the storage capacitor Cstg. The fourth period PR4 may be referred to as a light-emitting period.

Since the second anode initialization voltage VAINT2 of the first level V1 is applied in the third period PR3, the capacitor component Cle of the light-emitting element LE may be discharged (e.g., completely discharged) in the third period PR3.

Figure 18:
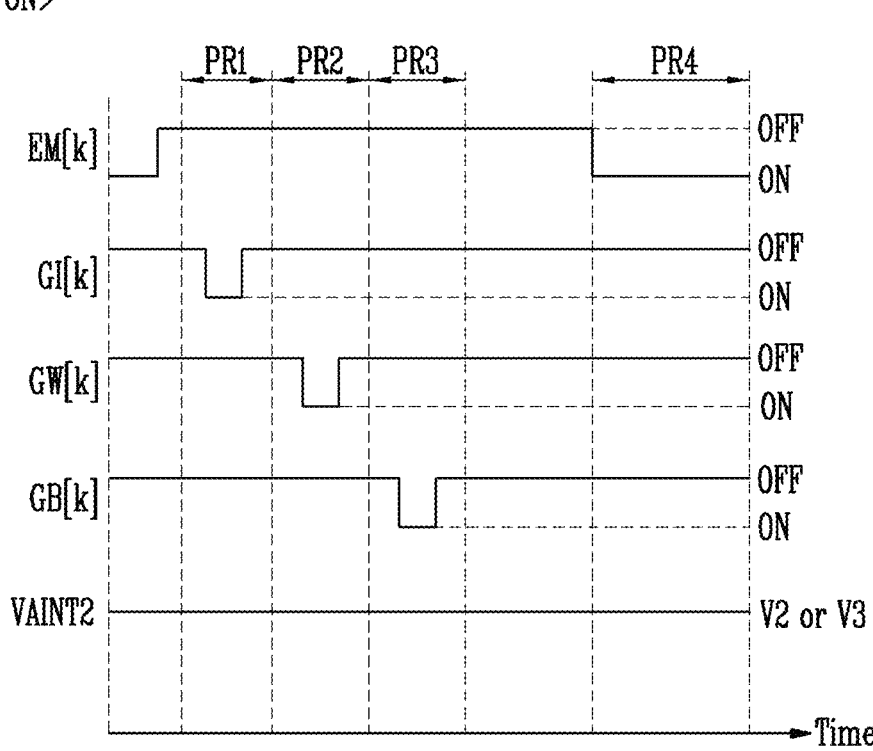
FIG. 18 is a timing diagram illustrating a method of driving a pixel according to an embodiment of the present disclosure during a period in which an infrared sensor operates.

FIG. 18 is a timing diagram illustrating a method of driving a pixel according to an embodiment of the present disclosure during a period IR-ON in which an infrared sensor operates.

Compared with the timing diagram of FIG. 17, the method of FIG. 18 differs in that the second anode initialization voltage VAINT2 has a second level V2 or a third level V3. The description of the level of the second anode initialization voltage VAINT2 is as described above with reference to FIG. 16, except that the anode is initialized to the second level V2 or the third level V3. Again referring to the example of FIG. 14, as the second anode initialization voltage VAINT2 of the second level V2 or the third level V3 is applied in the third period PR3, the capacitor component Cle of the light-emitting element LE may be charged (or remain charged) according to the potential difference between the second anode initialization voltage VAINT2 and the third power voltage ELVSS in the third period PR3 of FIG. 18. Accordingly, the time required for the capacitor component Cle of the light-emitting element LE to be charged in the fourth period PR4 is shortened, so that the display quality may be improved.

Figure 19:
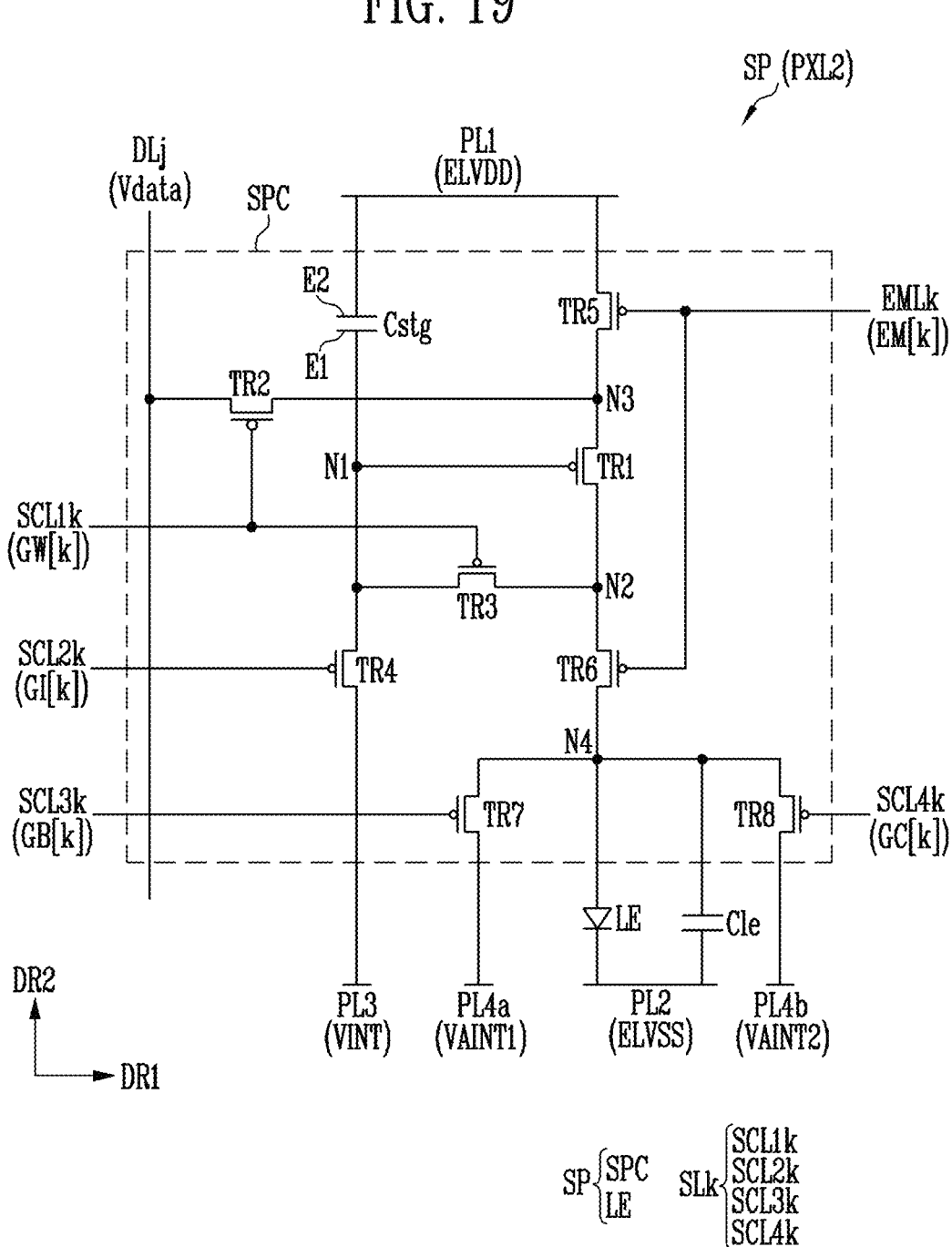
FIG. 19 is an equivalent circuit diagram of another embodiment of a sub-pixel included in a second pixel.

FIG. 19 is an equivalent circuit diagram according to another embodiment of a sub-pixel SP included in a second pixel PXL2.

Compared with FIG. 14, the sub-pixel SP according to the embodiment of FIG. 19 differs in the configuration of the seventh transistor TR7 and an eighth transistor TR8.

Referring to FIG. 19, the seventh transistor TR7 may be configured to switch the electrical connection between the fourth node N4 and the 4a$^{th}$ power line PL4a. The seventh transistor TR7 may include a gate electrode connected to the third sub-scan line SCL3k. The seventh transistor TR7 may switch the electrical connection between the 4a$^{th}$ power line PL4a and the fourth node N4 in response to the third scan signal GB[k] applied to the third sub-scan line SCL3k. The first anode initialization voltage VAINT1 may be applied to the 4a$^{th}$ power line PL4a.

The eighth transistor TR8 may be configured to switch the electrical connection between the fourth node N4 and the 4b$^{th}$ power line PL4b. The eighth transistor TR8 may include a gate electrode connected to the fourth sub-scan line SCL4k. The eighth transistor TR8 may switch the electrical connection between the fourth node N4 and the 4b$^{th}$ power line PL4b in response to the fourth scan signal GC[k] applied to the k$^{th}$ fourth sub-scan line SCL4k (hereinafter, also referred to as the fourth sub-scan line SCL4k). The second anode initialization voltage VAINT2 may be applied to the 4b$^{th}$ power line PL4b. In the above embodiment, the k$^{th}$ scan line SLk may include the fourth sub-scan line SCL4k. The eighth transistor TR8 may be referred to as a second anode initialization transistor. The eighth transistor TR8 may be referred to as a third initialization transistor.

In an embodiment, the eighth transistor TR8 may be implemented as a transistor including a P-type semiconductor. However, the embodiments of the present disclosure are not limited thereto, and the eighth transistor TR8 may be implemented as a transistor including an N-type semiconductor.

Figure 20:
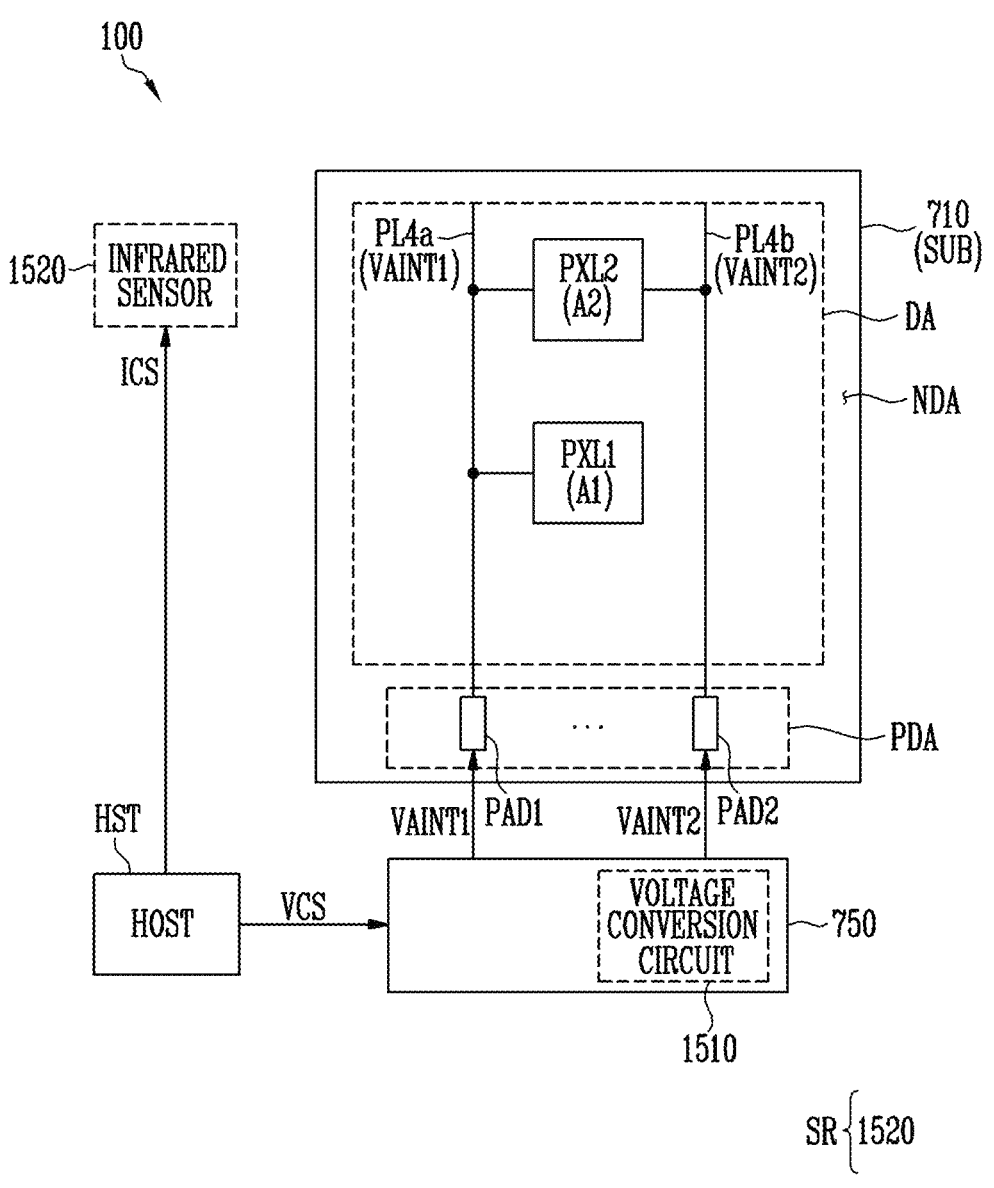
FIG. 20 is a block diagram of another embodiment of an electronic device according to the present disclosure.

FIG. 20 is a block diagram of an electronic device 100 according to an embodiment of the present disclosure.

Compared with the embodiment of FIG. 15, the second pixel PXL2 may be connected to the 4a$^{th}$ power line PL4a and the 4b$^{th}$ power line PL4b. The second pixel PXL2 may be connected to the first pad PAD1 through the 4a$^{th}$ power line PL4a. The second pixel PXL2 may be connected to the second pad PAD2 through the 4b$^{th}$ power line PL4b. The remaining configurations of the electronic device 100 of FIG. 20 may be similar or identical to the embodiment of FIG. 15, and descriptions elements described above are omitted here.

Figure 21:
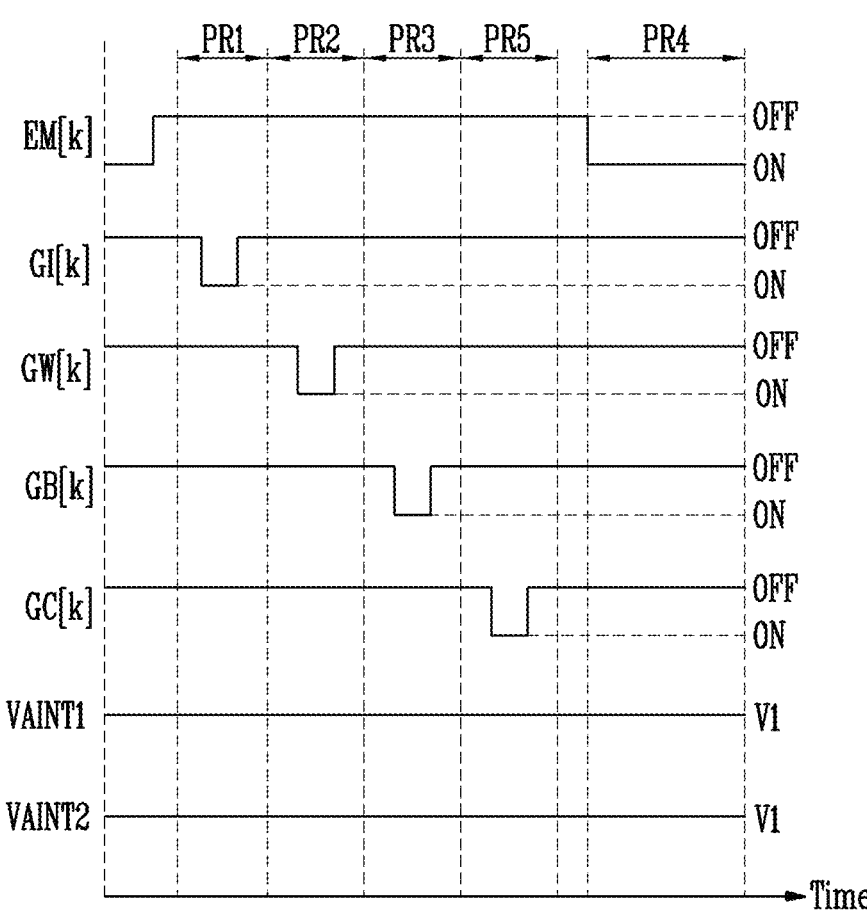
FIG. 21 is a timing diagram illustrating a method of driving a pixel according to an embodiment of the present disclosure during a period in which an infrared sensor does not operate.

FIG. 21 is a timing diagram illustrating a method of driving a pixel according to an embodiment of the present disclosure during a period IR-OFF in which an infrared sensor does not operate. Hereinafter, the timing of FIG. 21 is described with reference to an equivalent circuit diagram for the sub-pixel SP of the aforementioned FIG. 19.

Referring to FIG. 21, the method of driving a pixel during a period IR-OFF in which the infrared sensor does not operate may include first to fifth periods PR1 to PR5.

In the first period PR1, the light-emitting control signal EM[k] may have a turn-off level OFF. The second scan signal GI[k] may toggle to a turn-on level ON. The first scan signal GW[k] may have a turn-off level OFF. The third scan signal GB[k] may have a turn-off level OFF. The fourth scan signal GC[k] may have a turn-off level OFF. The first anode initialization voltage VAINT1 may have a first level V1. The second anode initialization voltage VAINT2 may have the first level V1. Accordingly, in the first period PR1, the third power voltage VINT may be applied to the first node N1 to initialize the voltage of the first node N1. The first period PR1 may be referred to as an initialization period.

In the second period PR2, the light-emitting control signal EM[k] may have a turn-off level OFF. The second scan signal GI[k] may have a turn-off level OFF. The first scan signal GW[k] may toggle to a turn-on level ON. The third scan signal GB[k] may have a turn-off level OFF. The fourth scan signal GC[k] may have a turn-off level OFF. The first anode initialization voltage VAINT1 may have a first level V1. The second anode initialization voltage VAINT2 may have the first level V1. Accordingly, in the second period PR2, the second and third transistors TR2 and TR3 may be turned on to write the data voltage Vdata to the sub-pixel SP. The second period PR2 may be referred to as a data writing period.

In the third period PR3, the light-emitting control signal EM[k] may have a turn-off level OFF. The second scan signal GI[k] may have a turn-off level OFF. The first scan signal GW[k] may have a turn-off level OFF. The third scan signal GB[k] may toggle to a turn-on level ON. The fourth scan signal GC[k] may have a turn-off level OFF. The first anode initialization voltage VAINT1 may have a first level V1. The second anode initialization voltage VAINT2 may have the first level V1. Accordingly, in the third period PR3, the voltage of the fourth node N4 may be initialized to the second anode initialization voltage VAINT1, e.g., the first level V1. The third period PR3 may be referred to as an anode first initialization period.

In the fifth period PR5, the light-emitting control signal EM[k] may have a turn-off level OFF. The second scan signal GI[k] may have a turn-off level OFF. The first scan signal GW[k] may have a turn-off level OFF. The third scan signal GB[k] may have a turn-off level OFF. The fourth scan signal GC[k] may toggle to a turn-on level ON. The first anode initialization voltage VAINT1 may have a first level V1. The second anode initialization voltage VAINT2 may have the first level V1. Accordingly, in the fifth period PR5, the voltage of the fourth node N4 may be initialized to the second anode initialization voltage VAINT2., e.g., the first level V1. The fifth period PR5 may be referred to as an anode second initialization period.

In the fourth period PR4, the light-emitting control signal EM[k] may have a turn-on level ON. The second scan signal GI[k] may have a turn-off level OFF. The first scan signal GW[k] may have a turn-off level OFF. The third scan signal GB[k] may have a turn-off level OFF. The fourth scan signal GC[k] may have a turn-off level OFF. The first anode initialization voltage VAINT1 may have a first level V1. The second anode initialization voltage VAINT2 may have the first level V1. Accordingly, in the fourth period, the light-emitting element LE may emit light with a luminance corresponding to the data voltage Vdata previously written in the storage capacitor Cstg. The fourth period PR4 may be referred to as a light-emitting period.

Since the first level V1 is applied in the third period PR3 and the fifth period PR5, the capacitor component Cle of the light-emitting element LE may be discharged (e.g., completely discharged) in the third or fifth period PR3 or PR5.

Figure 22:
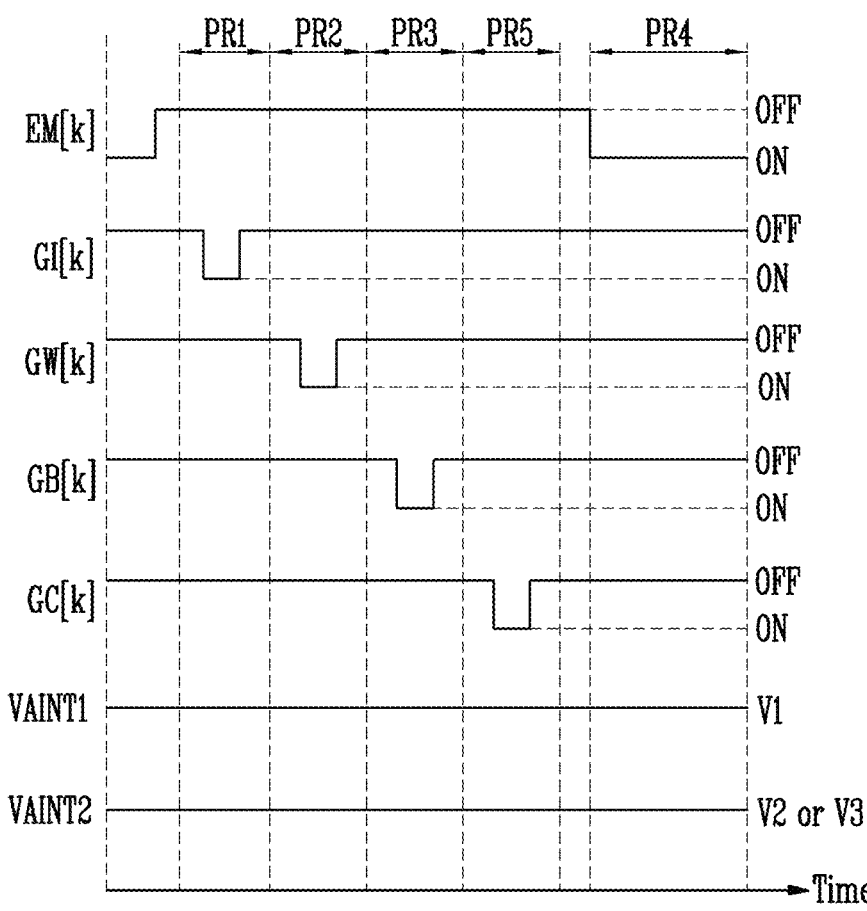
FIG. 22 is a timing diagram illustrating a method of driving a pixel according to an embodiment of the present disclosure during a period in which an infrared sensor operates.

FIG. 22 is a timing diagram illustrating a method of driving a pixel according to embodiments of the present disclosure during a period IR-ON in which an infrared sensor operates. Compared to the timing diagram of FIG. 21, the timing diagram of FIG. 22 differs in that the second anode initialization voltage VAINT2 has a second level V2 or a third level V3. The description for the level of the second anode initialization voltage VAINT2 in FIG. 22 is as described above with reference to FIG. 16.

Referring further to FIG. 22, as the first anode initialization voltage VAINT1 of the first level V1 is applied in the third period PR3, and the second anode initialization voltage VAINT2 of the second level V2 or the third level V3 is applied in the fifth period PR5, the capacitor component Cle of the light-emitting element LE may be charged to a size corresponding to the potential difference between the second anode initialization voltage VAINT2 and the third power voltage ELVSS. Accordingly, the time required for the capacitor component Cle of the light-emitting element LE to be charged in the fourth period PR4 is shortened, so that the display quality may be improved.

Figure 23:
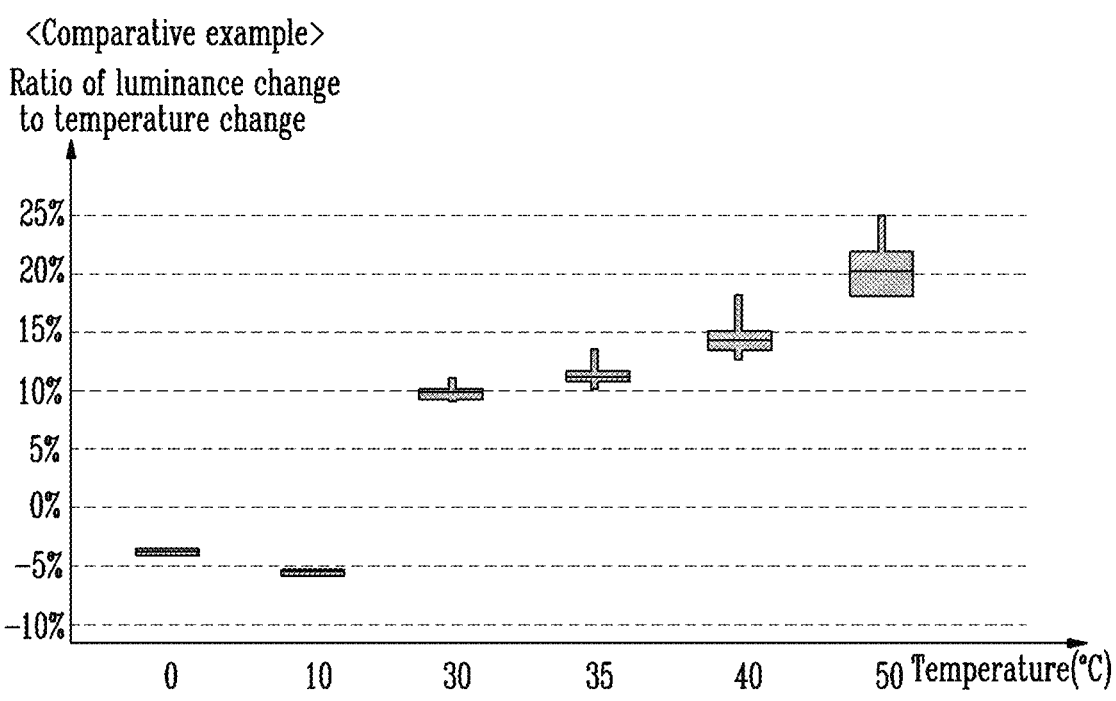
FIG. 23 is a diagram illustrating a luminance change ratio according to temperature in a comparative example.
Figure 24:
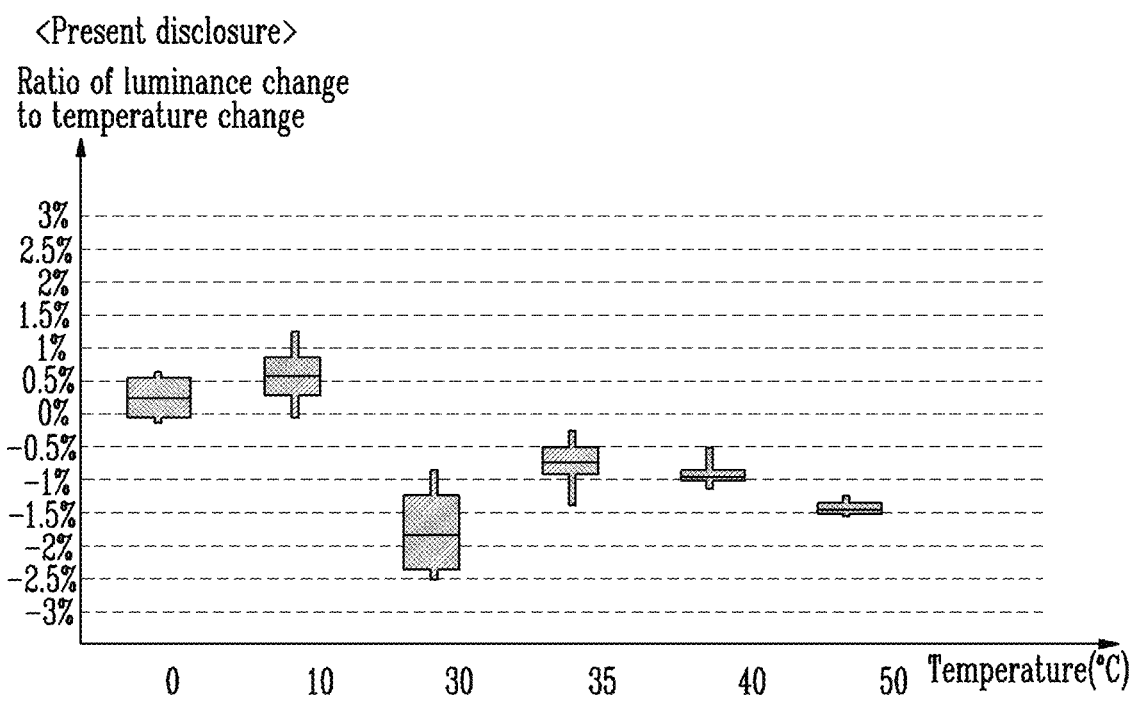
FIG. 24 is a diagram illustrating a luminance change ratio according to temperature in an embodiment of the present disclosure.

FIG. 23 is a diagram illustrating a luminance change ratio according to temperature in a comparative example. FIG. 24 is a diagram illustrating a luminance change ratio according to temperature in an embodiment of the present disclosure. FIGS. 23 and 24 each show luminance change ratios when the temperature of the display panel (or the temperature of the substrate) rises by 10° C. under six preset temperature conditions 0° C., 10° C., 30° C., 40° C., and 50° C. An experiment was conducted using four samples under each of the six temperature conditions. The experimental results under each temperature condition are plotted as candlestick graphs in FIGS. 23 and 24. The upper tail of the candlestick represents the maximum value of the luminance change ratio, and the lower tail of the candlestick represents the minimum value of the luminance change ratio. The black horizontal line in the body of the candlestick represents an average value of the luminance change ratio for four samples, and the body of the candlestick indicates ±1 sigma (or ±1 standard deviation) based on the average value for the four samples.

The comparative example of FIG. 23 corresponds to an embodiment in which, based on the timing diagram of FIG. 16, the level of the first anode initialization voltage VAINT1 and the level of the second anode initialization voltage VAINT2 are the same during the period IR-ON in which the infrared sensor operates.

FIG. 24 corresponds to an embodiment of the present disclosure in which, based on the timing diagram of FIG. 16, the level of the first anode initialization voltage VAINT1 and the level of the second anode initialization voltage VAINT2 (for example, the third level V3) differ by 0.2 V during the period IR-ON in which the infrared sensor operates.

In the comparative example of FIG. 23, the average and the standard deviation are respectively as shown in Table 1 below.

TABLE 1

| Temp | 0° C. | 10° C. | 30° C. | 35° C. | 40° C. | 50° C. |
|---|---|---|---|---|---|---|
| Avg | −3.79% | −5.44% | 9.76% | 11.48% | 14.70% | 20.30% |
| StdDev | 0.059% | 0.230% | 0.908% | 1.522% | 2.410% | 3.539% | light-emitting element LE may be discharged (e.g., completely discharged) in the third or fifth period PR3 or PR5.

FIG. 22 is a timing diagram illustrating a method of driving a pixel according to embodiments of the present disclosure during a period IR-ON in which an infrared sensor operates. Compared to the timing diagram of FIG. 21, the timing diagram of FIG. 22 differs in that the second anode initialization voltage VAINT2 has a second level V2 or a third level V3. The description for the level of the second anode initialization voltage VAINT2 in FIG. 22 is as described above with reference to FIG. 16.

Referring further to FIG. 22, as the first anode initialization voltage VAINT1 of the first level V1 is applied in the third period PR3, and the second anode initialization voltage VAINT2 of the second level V2 or the third level V3 is applied in the fifth period PR5, the capacitor component Cle of the light-emitting element LE may be charged to a size corresponding to the potential difference between the second anode initialization voltage VAINT2 and the third power voltage ELVSS. Accordingly, the time required for the capacitor component Cle of the light-emitting element LE to be charged in the fourth period PR4 is shortened, so that the display quality may be improved.

FIG. 23 is a diagram illustrating a luminance change ratio according to temperature in a comparative example. FIG. 24 is a diagram illustrating a luminance change ratio according to temperature in an embodiment of the present disclosure. FIGS. 23 and 24 each show luminance change ratios when the temperature of the display panel (or the temperature of In Table 1, Temp indicates the temperature condition. Avg indicates the average value. StdDev indicates the standard deviation.

Under the 0° C. condition, the average value of the luminance change ratio of four samples is about −3.79%, and the standard deviation is about 0.059%. When rising from 0° C. to 10° C., the luminance may decrease by about 3.79%, and the standard deviation of the luminance change ratio may be about 0.059%.

Under 10° C. conditions, the average value of the luminance change ratio of four samples is about −5.44%, and the standard deviation is about 0.230%. When rising from 10° C. to 20° C., the luminance may decrease by about 5.44%, and the standard deviation of the luminance change ratio may be about 0.230%.

Under 30° C. conditions, the average value of the luminance change ratio of four samples is about 9.76%, and the standard deviation is about 0.908%. When rising from 30° C. to 40° C., the luminance may increase by about 9.76%, and the standard deviation of the luminance change ratio may be about 0.908%.

Under 35° C. conditions, the average value of the luminance change ratio of four samples is about 11.48%, and the standard deviation is about 1.522%. When rising from 35° C. to 45° C., the luminance may increase by about 11.48%, and the standard deviation of the luminance change ratio may be about 1.522%.

Under the condition of 40° C., the average value of the luminance change ratio of four samples is about 14.70%, and the standard deviation is about 2.410%. When rising from 40° C. to 50° C., the luminance may increase by about 14.70%, and the standard deviation of the luminance change ratio may be about 2.410%.

Under the condition of 50° C., the average value of the luminance change ratio of four samples is about 20.30%, and the standard deviation is about 3.539%. When rising from 50° C. to 60° C., the luminance may increase by about 20.30%, and the standard deviation of the luminance change ratio may be about 3.539%.

Referring to this, under the conditions of 0° C. and 10° C., which are close to room temperature, the luminance significantly decreases as the temperature increases by 10° C. In addition, under conditions of relatively high temperatures of 30° C. or higher, the luminance significantly increases as the temperature increases, and the standard deviation also expands.

In the present disclosure of FIG. 24, the average and standard deviation are respectively as shown in Table 2 below.

TABLE 2

| Temp | 0° C. | 10° C. | 30° C. | 35° C. | 40° C. | 50° C. |
|---|---|---|---|---|---|---|
| Avg | 0.22% | 0.53% | −1.79% | −0.80% | −0.96% | −1.45% |
| StdDev | 0.430% | 0.565% | 0.805% | 0.485% | 0.235% | 0.173% |

In Table 2, Temp indicates the temperature condition. Avg indicates the average value. StdDev indicates the standard deviation.

The average value of the luminance change ratio of four samples under the 0° C. condition is about 0.22%, and the standard deviation is about 0.430%. When rising from 0° C. to 10° C., the luminance may increase by about 0.22%, and the standard deviation of the luminance change ratio may be about 0.430%.

Under 10° C. conditions, the average value of the luminance change ratio of four samples is about 0.53%, and the standard deviation is about 0.565%. When rising from 10° C. to 20° C., the luminance may increase by about 0.53%, and the standard deviation of the luminance change ratio may be about 0.565%.

Under 30° C. conditions, the average value of the luminance change ratio of four samples is about −1.79%, and the standard deviation is about 0.805%. When rising from 30° C. to 40° C., the luminance may decrease by about 1.79%, and the standard deviation of the luminance change ratio may be about 0.805%.

Under 35° C. conditions, the average value of the luminance change ratio of four samples is about −0.80%, and the standard deviation is about 0.485%. When rising from 35° C. to 45° C., the luminance may decrease by about 0.80%, and the standard deviation of the luminance change ratio may be about 0.485%.

Under the 40° C. condition, the average value of the luminance change ratio of four samples is about −0.96%, and the standard deviation is about 0.235%. When rising from 40° C. to 50° C., the luminance may decrease by about 0.96%, and the standard deviation of the luminance change ratio may be about 0.235%.

Under the 50° C. condition, the average value of the luminance change ratio of four samples is about −1.45%, and the standard deviation is about 0.173%. When rising from 50° C. to 60° C., the luminance may increase by about 1.45%, and the standard deviation of the luminance change ratio may be about 0.173%.

Referring to this, under conditions of 0° C. and 10° C., which are close to room temperature, the luminance change rate is very small even if the temperature increases by 10° C. In addition, under conditions of relatively high temperatures of 30° C. or higher, the luminance change ratio is stably controlled at a low level even if the temperature increases.

Accordingly, embodiments of the present disclosure may limit the luminance change ratio caused by temperature change to a low level and thereby improve display quality.

Figure 25:
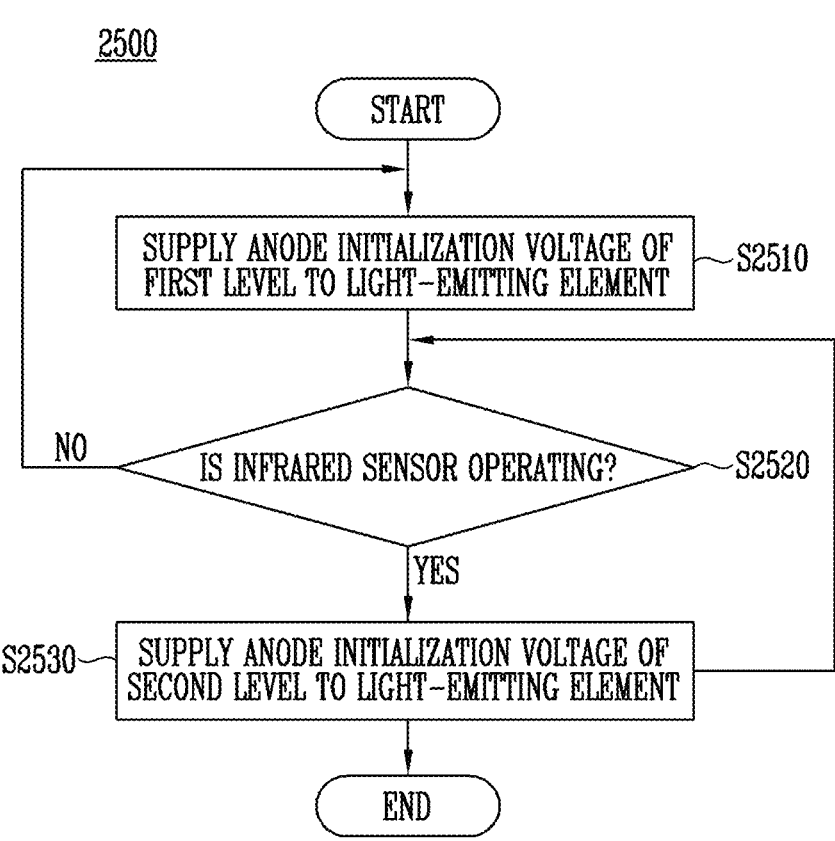
FIG. 25 is a flowchart of a method of driving an electronic device according to an embodiment of the present disclosure.

FIG. 25 is a flowchart of a method 2500 of driving an electronic device 100 (see FIG. 1) according to an embodiment of the present disclosure.

Referring to FIG. 25, the method 2500 of driving an electronic device may include a step S2510 of supplying an anode initialization voltage having a first level to a light-emitting element, a step S2520 of determining whether an infrared sensor is operating, and a step S2530 of supplying an anode initialization voltage having a second level (e.g., a second anode initialization voltage of the second level) to the light-emitting element.

If the step S2520 determines that the infrared sensor is not operating, the step S2510 of supplying the anode initialization voltage at the first level to the light-emitting element may be performed. If the step S2520 determines that the infrared sensor is operating, the step S2530 of supplying the anode initialization voltage at the second level to the light-emitting element may be performed. Here, the second level may refer to a voltage level different from the first level.

After the step S2530 of supplying the anode initialization voltage at the second level to the light-emitting element, the step S2520 of determining whether the infrared sensor is operating may be performed again. When the driving of the display device is terminated, the method 2500 may proceed to the end.

Referring further to FIG. 15, in the step S2520 of determining whether the infrared sensor is operating, the host HST of the electronic device 100 may determine whether the infrared sensor 1520 is operating. Accordingly, the visibility of the electronic device 100 may be improved while the sensor SR is operating.

A display device, an electronic device including the same, and a method of driving the same according to embodiments of the present disclosure may improve visibility by compensating for changes in luminance due to operations of a sensor.

The drawings and the detailed description of the disclosure described herein are merely exemplary of the present disclosure, are used only for the purpose of explaining the present disclosure, and are not used to limit the scope of the present disclosure described in the claims. Therefore, those skilled in the art will understand that various modifications and equivalent other embodiments are possible therefrom. Therefore, the scope of protection provided by the present disclosure should be determined from the appended patent claims.

What is claimed is:
1. An electronic device comprising:
a sensor configured to emit infrared light;

a display device comprising a first display area in which first pixels are disposed at a first density and a second display area in which second pixels are disposed at a second density lower than the first density, the display device being configured to supply a first anode initialization voltage to the first pixels and supply a second anode initialization voltage to the second pixels; and a host configured to output a control signal to the display device so that a voltage level of the second anode initialization voltage becomes higher than a voltage level of the first anode initialization voltage while the sensor emits the infrared light.

2. The electronic device according to claim 1, wherein the sensor is located to overlap with the second display area in a direction in which the infrared light is emitted.

3. The electronic device according to claim 1, wherein the first display area surrounds the second display area.

4. The electronic device according to claim 1, wherein the display device comprises a power supply circuit configured to supply the first anode initialization voltage and the second anode initialization voltage, and the host is configured to:

output an infrared sensor control signal for controlling a timing at which the sensor outputs the infrared light; and output a power supply circuit control signal for changing the voltage level of the second anode initialization voltage output by the power supply circuit in accordance with a timing at which a level of the infrared sensor control signal changes.

5. The electronic device according to claim 4, wherein the infrared sensor control signal has either a low level corresponding to a period in which the sensor is not operating or a high level corresponding to a period in which the sensor is operating, the power supply circuit is configured to raise the voltage level of the second anode initialization voltage from a first level during a period in which the infrared sensor control signal of the high level is input to the sensor, and the first level is the level of the first anode initialization voltage.

6. The electronic device according to claim 5, wherein the power supply circuit is configured to, when the sensor emits the infrared light, supply the second anode initialization voltage at a second level higher than the first level for a threshold period.

7. The electronic device according to claim 6, wherein a length of the threshold period is less than one minute.

8. The electronic device according to claim 6, wherein the power supply circuit is configured to, when the sensor emits the infrared light and the threshold period has elapsed, supply the second anode initialization voltage at a third level higher than the second level.

9. The electronic device according to claim 6, wherein the power supply circuit is configured to, when the sensor stops emitting the infrared light, supply the second anode initialization voltage at the first level.

* * * * *